(12) United States Patent
Liu et al.

(10) Patent No.: US 10,637,668 B2
(45) Date of Patent: Apr. 28, 2020

(54) AUTHENTICATION METHOD, SYSTEM AND EQUIPMENT

(71) Applicant: TENCENT TECHNOLOGY (SHENZHEN) COMPANY LIMITED, Shenzhen, Guangdong (CN)

(72) Inventors: Wenqing Liu, Shenzhen (CN); Zixi Shen, Shenzhen (CN); Qiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 78 days.

(21) Appl. No.: 15/771,511

(22) PCT Filed: Apr. 25, 2017

(86) PCT No.: PCT/CN2017/081894
§ 371 (c)(1),
(2) Date: Apr. 27, 2018

(87) PCT Pub. No.: WO2017/186100
PCT Pub. Date: Nov. 2, 2017

(65) Prior Publication Data
US 2018/0343123 A1 Nov. 29, 2018

(30) Foreign Application Priority Data
Apr. 27, 2016 (CN) .......................... 2016 1 0272591

(51) Int. Cl.
*H04L 9/32* (2006.01)
*H04L 29/06* (2006.01)

(52) U.S. Cl.
CPC ............ *H04L 9/3247* (2013.01); *H04L 9/321* (2013.01); *H04L 9/3234* (2013.01);
(Continued)

(58) Field of Classification Search
None
See application file for complete search history.

(56) References Cited

U.S. PATENT DOCUMENTS

| 9,600,676 B1* | 3/2017 | Farmer | ................... G06F 21/62 |
| 2009/0132813 A1* | 5/2009 | Schibuk | ............... G06Q 20/223 |
| | | | 713/158 |

(Continued)

FOREIGN PATENT DOCUMENTS

| CN | 103716794 A | 4/2014 |
| CN | 104243484 A | 12/2014 |

(Continued)

OTHER PUBLICATIONS

Second Opinion of notice of CN 2016102725917 dated Jul. 7, 2017.
(Continued)

*Primary Examiner* — Brandon S Hoffman
(74) *Attorney, Agent, or Firm* — Sughrue Mion, PLLC

(57) ABSTRACT

An identity authentication method includes sending, by a third-party application client, an operation request to a third-party application server, in response to receiving a first operation indication for requesting to perform a target operation, the operation request requesting the third-party application server to perform the target operation, and receiving, by the third-party application client, to-be-signed information from an authentication server via the third-party application server, in response to the operation request being sent, the to-be-signed information comprising a challenge random number. The method further includes forwarding, by the third-party application client, the to-be-signed information that is received, to intelligent hardware, and receiving, by the third-party application client, a first signature result from the intelligent hardware, the first signature result being obtained by signing the to-be-signed information that is (Continued)

forwarded, using an application private key corresponding to a third-party application.

20 Claims, 16 Drawing Sheets

(52) U.S. Cl.
CPC .......... *H04L 9/3265* (2013.01); *H04L 9/3271* (2013.01); *H04L 63/0823* (2013.01); *H04L 63/0861* (2013.01); *H04L 63/102* (2013.01); *H04L 2209/76* (2013.01)

(56) References Cited

U.S. PATENT DOCUMENTS

2014/0156531 A1\* 6/2014 Poon .................. G06Q 20/4016
  705/44
2014/0294175 A1\* 10/2014 Boloker .................. G06T 1/005
  380/30

FOREIGN PATENT DOCUMENTS

| CN | 104601327 A | 5/2015 |
| CN | 105871867 A | 8/2016 |
| WO | 2015/047555 A1 | 4/2015 |

OTHER PUBLICATIONS

Third Opinion of notice of CN 2016102725917 dated Sep. 25, 2017.
International Search Report for PCT/CN2017/081894 dated Jul. 18, 2017 [PCT/ISA/210].

\* cited by examiner

AUTHENTICATION METHOD, SYSTEM AND EQUIPMENT

CROSS-REFERENCE TO RELATED APPLICATIONS

This application is a U.S. national stage application under 35 U.S.C. § 371 of International Patent Application No. PCT/CN2017/081894, filed on Apr. 25, 2017, which claims priority from Chinese Patent Application No. 2016102725917, filed on Apr. 27, 2016, in the Chinese Patent Office, the disclosure of which is incorporated herein by reference in its entirety.

BACKGROUND

1. Field

Methods and apparatuses consistent with example embodiments relate to the field of Internet technologies, and in particular, to an identity authentication method, an identity authentication method system, and an identity authentication method device.

2. Description of Related Art

With the development of Internet technologies, everyday activities of users are closely related to networks.

Identity authentication needs to be performed on a user when the user performs some network operations. Identity authentication, also referred to as "identity verification" or "identity recognition," is a process of confirming the identity of an operator in a computer and in a network system of computers. In the process, it is determined whether the user has the right to access and use a resource, so that access policies of the computer and the network system can be carried out reliably and effectively, to prevent an attacker from pretending to be an authorized user to obtain the right to access a resource and ensure the security of the system and data as well as lawful rights of an authorized visitor. For example, for a login operation, the user may input a user account and a password in a corresponding input box to complete a login procedure. Further, for example, for a payment operation, the user may input a payment password in a corresponding input box to complete a payment procedure.

A user needs to manually input related information (for example, a user account and a password) for identity authentication in an existing identity authentication manner. As a result, when the user performs a network operation that requires identity authentication, operations are complex and inefficient.

SUMMARY

According to example embodiments, there is provided an identity authentication method including sending, by a third-party application client, an operation request to a third-party application server, in response to receiving a first operation indication for requesting to perform a target operation, the operation request requesting the third-party application server to perform the target operation, and receiving, by the third-party application client, to-be-signed information from an authentication server via the third-party application server, in response to the operation request being sent, the to-be-signed information including a challenge random number. The method further includes forwarding, by the third-party application client, the to-be-signed information that is received, to intelligent hardware, and receiving, by the third-party application client, a first signature result from the intelligent hardware, the first signature result being obtained by signing the to-be-signed information that is forwarded, using an application private key corresponding to a third-party application. The method further includes transparently transmitting, by the third-party application client, the first signature result that is received, to the authentication server via the third-party application server, to verify whether the first signature result is correct by using an application public key corresponding to the third-party application, and to trigger the third-party application server to perform the target operation when the first signature result is correct.

According to example embodiments, there is provided an identity authentication method including receiving, by a third-party application server, an operation request from a third-party application client, the operation request requesting the third-party application server to perform a target operation, and requesting and receiving, by the third-party application server, to-be-signed information from an authentication server, in response to the operation request being received, the to-be-signed information including a challenge random number. The method further includes forwarding, by the third-party application server, the to-be-signed information that is received, to intelligent hardware via the third-party application client, and receiving, by the third-party application server, a first signature result from the intelligent hardware via the third-party application client, the first signature result being obtained by signing the to-be-signed information that is forwarded, using an application private key corresponding to a third-party application. The method further includes transparently transmitting, by the third-party application server, the first signature result that is received, to the authentication server, and receiving, by the third-party application server, a verification success indication from the authentication server, in response to the first signature result that is transmitted being verified to be correct by using an application public key corresponding to the third-party application. The method further includes performing, by the third-party application server, the target operation, in response to the verification success indication being received.

According to example embodiments, there is provided a third-party application client including at least one first memory configured to store first computer program code, and at least one first processor configured to access the at least one first memory and operate according to the first computer program code. The first computer program code includes first sending code configured to cause the at least one first processor to send an operation request to a third-party application server, in response to receiving a first operation indication for requesting to perform a target operation, the operation request requesting the third-party application server to perform the target operation, and first receiving code configured to cause the at least one first processor to receive to-be-signed information from an authentication server via the third-party application server, in response to the operation request being sent, the to-be-signed information including a challenge random number. The first computer program further includes forwarding code configured to cause the at least one first processor to forward the to-be-signed information that is received, to intelligent hardware, and second receiving code configured to cause the at least one first processor to receive a first signature result from the intelligent hardware, the first signature result being obtained by signing the to-be-signed information that is forwarded, using an application private key corresponding to a third-party application. The first computer program further includes first transmitting code configured to cause the at least one first processor to transparently transmit the first signature result that is received, to the authentication server via the third-party application server, to verify whether the first signature result is correct by using an application public key corresponding to the third-party application, and to trigger the third-party application server to perform the target operation when the first signature result is correct.

BRIEF DESCRIPTION OF THE DRAWINGS

To describe technical solutions of example embodiments more clearly, the following briefly introduces accompanying drawings for describing the example embodiments. Apparently, the accompanying drawings in the following description show some example embodiments, and a person of ordinary skill in the technology may still derive other drawings from these accompanying drawings without creative efforts.

DESCRIPTION OF EXAMPLE EMBODIMENTS

To make objectives, technical solutions, and advantages of example embodiments clearer, the following further describes implementations of the example embodiments in detail with reference to the accompanying drawings.

To resolve the problem that operations are complex and inefficient when a user performs a network operation that requires identity authentication, because the user needs to manually input related information for identity authentication in an identity authentication manner in the related technology, example embodiments provide an authentication method, system, and device.

Figure 1:
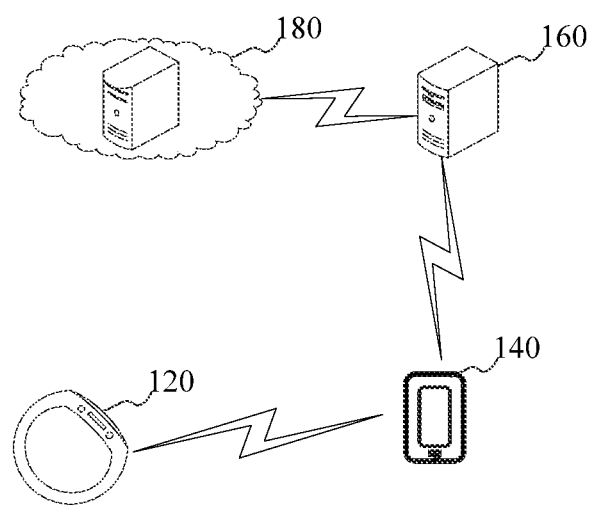
FIG. 1 is a schematic diagram of an implementation environment according to example embodiments.

FIG. 1 is a schematic diagram of an implementation environment according to example embodiments. The implementation environment includes intelligent hardware 120, a third-party application client 140, a third-party application server 160, and an authentication server 180.

The intelligent hardware 120 is a hardware device that has a digital signature function and a key management function and is used to provide identity authentication. The intelligent hardware 120 may use a Bluetooth interface or near field communication (NFC) interface. For example, the intelligent hardware 120 may be a wearable device such as a smart band and a smart watch.

The third-party application client 140 may also be referred to as a third-party application middleware and is a drive or a control carried on a third-party application (APP). The third-party application client 140 is a main portal for a user login and authentication. The third-party application client 140 may be provided by a system platform or may be provided by a third-party application provider. The third-party application client 140 may be configured to provide the following services: 1. registration, application, and login of a user account in the third-party application; 2. recording of a default authentication manner of a user; 3. remote viewing of a payment record; and 4. management of authorized intelligent hardware 120. The third-party application client 140 may be installed and run on a terminal such as a mobile phone and a tablet computer.

The third-party application server 160 is an existing backend management system or a newly built backend management system of the third-party application client 140 and is responsible for data forwarding or routing between the third-party application client 140 and the authentication server 180. The third-party application server 160 may be provided by the system platform or the third-party application provider. The third-party application server 160 may be configured to provide the following services: 1. message forwarding between the third-party application client 140 and the authentication server 180; 2. management of the user account in the third-party application, including maintenance of an account status (for example, suspension, or deregistration). 3. processing of data returned by the authentication server 180; and 4. storage of valid authentication data.

The authentication server 180 is configured to provide a set of configuration options to an authenticatee (that is, the name for the intelligent hardware 120, the third-party application client 140, and the third-party application server 160). The authenticatee may manage and apply parameters related to an account by using settings of related protocols. The authentication server 180 may be a cloud platform server. To keep the consistency of user experience, the authentication server 180 may support functions, including: registration and binding, login, payment, unbinding, and loss-reporting. The authentication server 180 may implement the following functions: 1. registration and binding of the intelligent hardware 120; 2. authentication and authorization of the authenticatee; 3. secure storage of key information; 4. release of an identifier of the intelligent hardware 120; 5.

management of a plurality of applications; 6. status management and remote configuration of the intelligent hardware 120.

In addition, the intelligent hardware 120 may communicate with the third-party application client 140 by using short-range wireless communications technologies such as Bluetooth and NFC. The third-party application client 140 communicates with the third-party application server 160 by using a wireless or wired network. The third-party application server 160 communicates with the authentication server 180 by using a wireless or wired network.

For ease of understanding, some nouns used in this specification are introduced and described.

1. Hardware Certificate

A hardware certificate is a unique digital certificate used to identify intelligent hardware. The hardware certificate may conform to the Distinguished Encoding Rules (DER) encoding format in the X.509 standard. A corresponding hardware certificate is written during pre-personalization of each piece of intelligent hardware. The hardware certificate is a certificate that is issued by the CA (Certificate Authority) of an authentication server by using a system root certificate and is stored in the intelligent hardware, and is used to ensure the authenticity of the intelligent hardware.

A hardware public key, a hardware private key, and an identifier of the intelligent hardware are generated during production of the intelligent hardware. The hardware certificate of the intelligent hardware may also be planted in advance in the intelligent hardware during the production of the intelligent hardware. The content of the hardware certificate includes the hardware public key and the identifier of the intelligent hardware.

2. Identifier of Intelligent Hardware

An identifier of intelligent hardware may also be referred to as a hardware sequence number and maybe represented by an H-ID. The identifier of the intelligent hardware is used to uniquely identify the intelligent hardware and is planted in advance in the intelligent hardware upon delivery of the intelligent hardware.

For example, the identifier of the intelligent hardware has a total of 16 digits, and has a format as follows:

The first digit and the second digit are a product model, represent a product type of the intelligent hardware, and range from "01" to "99."

The third digit and the fourth digit are a manufacturer sequence number, represents a sequence number of a production manufacturer of the intelligent hardware, and range from "01" to "99."

The fifth digit and the sixth digit are the year of production, and use two digits of a natural year. For example, for the year 2016, the value is "16."

The seventh digit and the eighth digit are the month of production, and range from "01" to "12."

The ninth digit to the sixteenth digit are a natural sequence number, range from "00000001" to "99999999," and satisfy the production of 100 million pieces per month.

3. Application Key Index

An application key index is generated by intelligent hardware and is internally generated application key used to index the intelligent hardware. The application key index may be represented by Keyhandle and has a variable length from 0x00 to 0xff. The application key index is generated during registration and binding of a user account that is logged in to in a third-party application, and is verified by the intelligent hardware in a login procedure, a payment procedure, and the like.

4. Identifier of Third-Party Application

An identifier of a third-party application is used to uniquely identify the third-party application. An application provider provides such identifiers of different types of applications. Such an identifier may be represented by an AppID.

Figure 2:
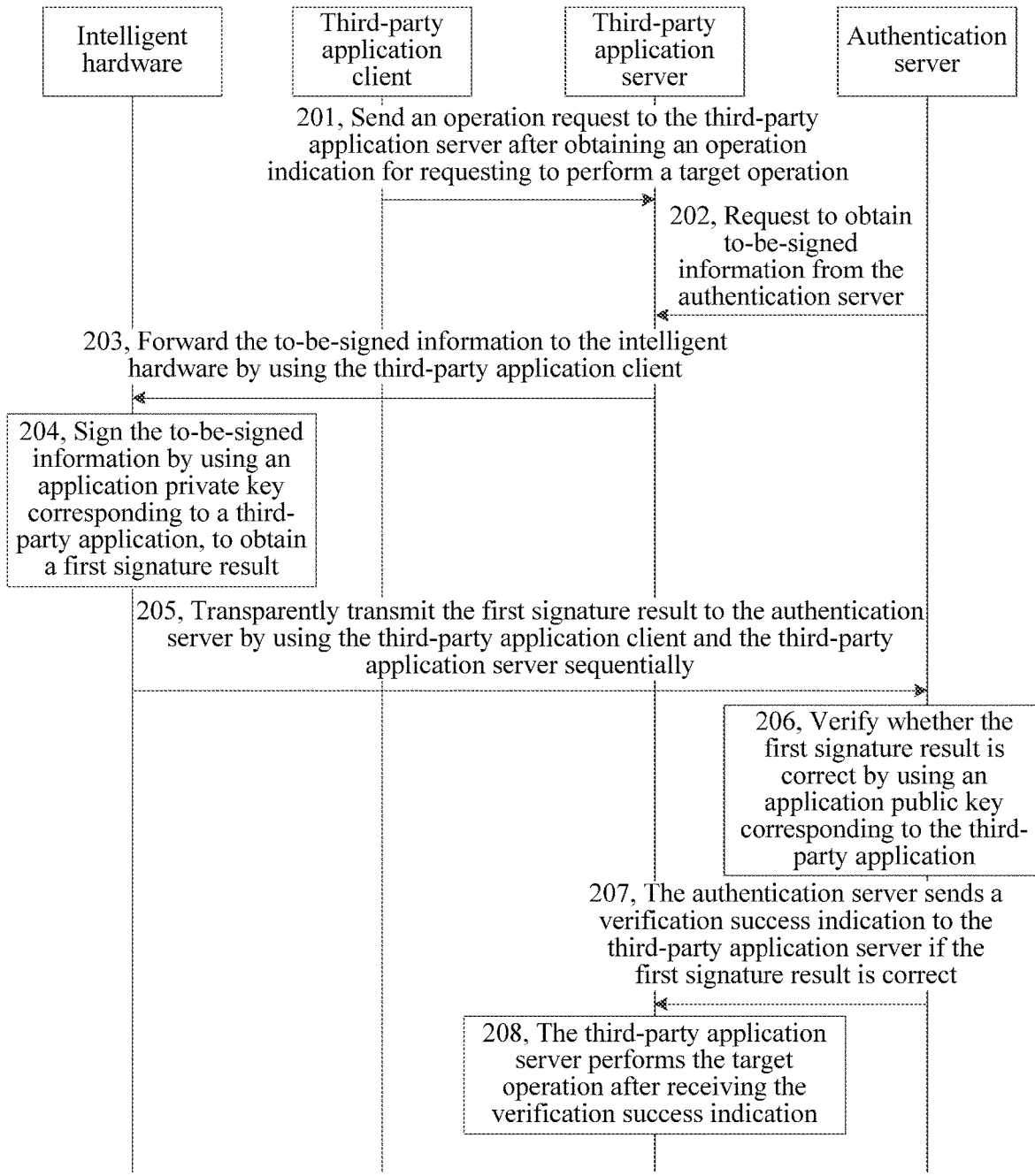
FIG. 2 is a flowchart of an identity authentication method according to example embodiments.

FIG. 2 is a flowchart of an identity authentication method according to example embodiments. The method may be applied to the implementation environment shown in FIG. 1. The method may include several steps as follows:

Step 201: A third-party application client sends an operation request to a third-party application server after obtaining an operation indication for requesting to perform a target operation, the operation request being used to request the third-party application server to perform the target operation.

Correspondingly, the third-party application server receives the operation request sent by the third-party application client.

Step 202: The third-party application server requests to obtain to-be-signed information from an authentication server.

Step 203: The third-party application server forwards the to-be-signed information to intelligent hardware by using the third-party application client.

Correspondingly, the intelligent hardware receives the to-be-signed information forwarded by the third-party application server by using the third-party application client.

Step 204: The intelligent hardware signs the to-be-signed information by using an application private key corresponding to a third-party application, to obtain a first signature result.

Step 205: The intelligent hardware transparently transmits the first signature result to the authentication server by using the third-party application client and the third-party application server sequentially.

Correspondingly, the authentication server receives the first signature result transparently transmitted by using the third-party application client and the third-party application server sequentially by the intelligent hardware.

Step 206: The authentication server verifies whether the first signature result is correct by using an application public key corresponding to the third-party application.

Step 207: The authentication server sends a verification success indication to the third-party application server if the first signature result is correct.

Correspondingly, the third-party application server receives the verification success indication sent by the authentication server.

Step 208: The third-party application server performs the target operation after receiving the verification success indication.

To sum up, in the method provided in these example embodiments, intelligent hardware signs to-be-signed information to obtain a first signature result, and an authentication server instructs a third-party application server to perform a target operation when verifying that the first signature result is correct. The problem that operations are complex and inefficient when a user performs a network operation that requires identity authentication because the user needs to manually input related information for identity authentication in an existing identity authentication manner is resolved. The intelligent hardware is used to implement identity authentication, the user does not need to manually input related information for identity authentication, so that it is more convenient and efficient for the user to perform a network operation that requires identity authentication.

A registration and binding procedure needs to be completed before the intelligent hardware implements identity authentication, to establish a binding relationship between the intelligent hardware and the user account of the third-party application. For a process of the registration and binding procedure, refer to the following introduction and description in example embodiments shown in FIG. 6 and FIG. 7.

In the registration and binding procedure, the intelligent hardware generates the application public key corresponding to the third-party application and the application private key, sends the application public key to the authentication server, and saves the application private key locally. Optionally, the intelligent hardware further generates an application key index, where the application key index is used to index the application public key corresponding to the third-party application and the application private key. The intelligent hardware stores a binding relationship between the application private key corresponding to the third-party application and the application key index.

The authentication server stores a first binding relationship after the registration and binding procedure is completed. The first binding relationship at least includes a binding relationship among an identifier of the intelligent hardware, the user account, and the application public key corresponding to the third-party application. Optionally, the first binding relationship further includes the application key index. Optionally, the first binding relationship further includes an identifier of the third-party application.

The third-party application server stores a second binding relationship after the registration and binding procedure is completed. The second binding relationship at least includes a binding relationship between the identifier of the intelligent hardware and the user account. Optionally, the second binding relationship further includes the application key index.

The intelligent hardware can implement identity authentication after the registration and binding procedure is completed, to implement rapid login and rapid payment.

Figure 3:
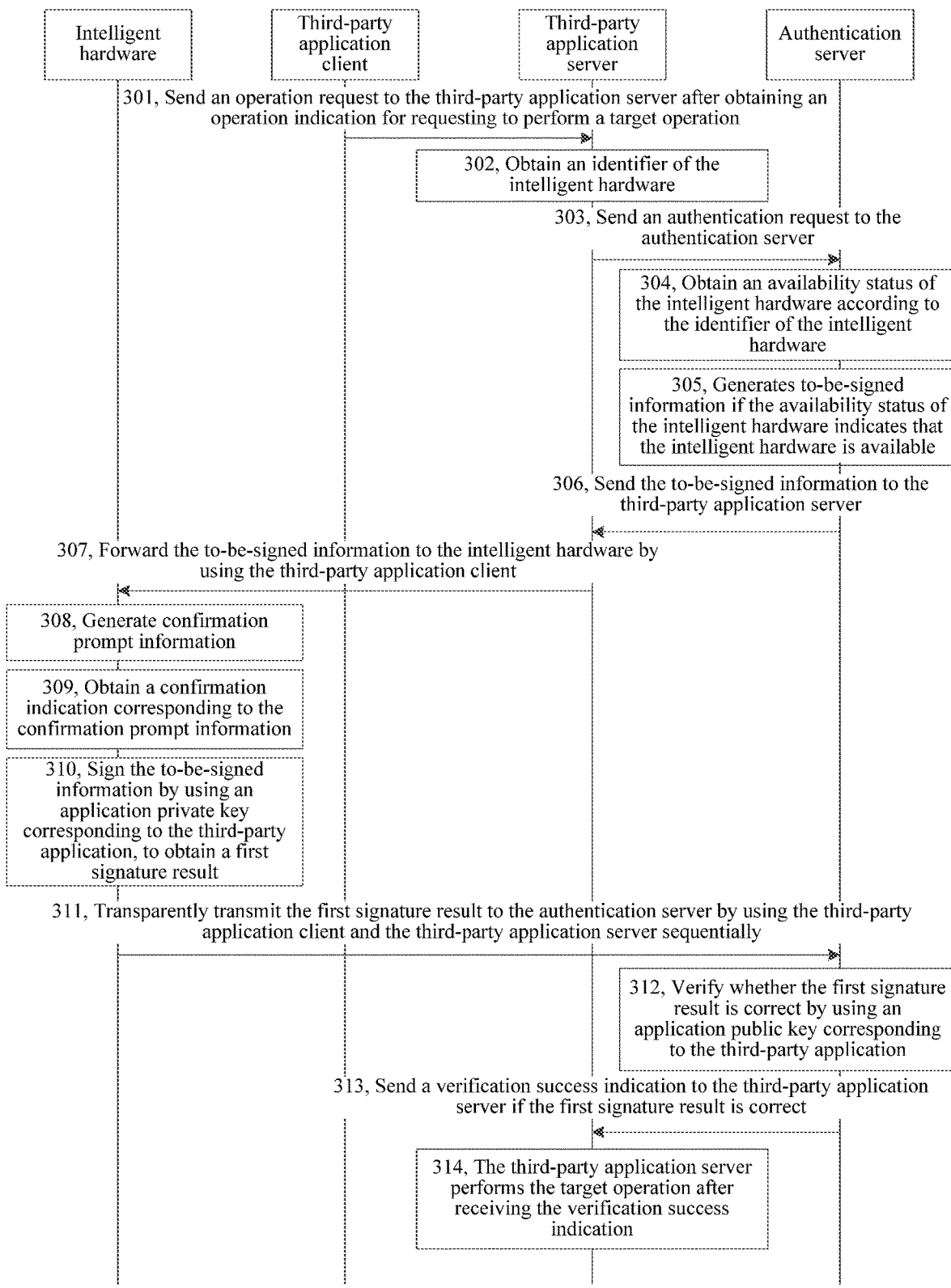
FIG. 3 is a flowchart of an identity authentication method according to example embodiments.

FIG. 3 is a flowchart of an identity authentication method according to example embodiments. The method may be applied to the implementation environment shown in FIG. 1. The method may include several steps as follows:

Step 301: A third-party application client sends an operation request to a third-party application server after obtaining an operation indication for requesting to perform a target operation.

The operation request is used to request the third-party application server to perform the target operation. The target operation is a network operation that requires identity authentication on a user. For example, the target operation is a login operation or a payment operation. The login operation is a login to a user account registered by the user in a third-party application. The payment operation is network payment to a target object by using the third-party application.

The user may perform an operation to trigger the third-party application client to display a verification mode selection interface when wanting to perform a login operation or a payment operation. The verification mode selection interface may display an intelligent hardware verification option and a password verification option. The user may select a corresponding verification mode according to a requirement. The third-party application client can obtain the operation indication for requesting to perform the target operation when detecting a selection instruction on the intelligent hardware verification option, and can further send the operation request to the third-party application server. That is, the operation indication for requesting to perform the target operation is triggered by the user. For another example, the user clicks a first operation control in a login interface provided by the third-party application client to trigger the third-party application client to obtain an operation indication for requesting to perform the login operation. For further an example, the user clicks a second operation control in a payment interface provided by the third-party application client to trigger the third-party application client to obtain an operation indication for requesting to perform the payment operation.

Optionally, the operation request sent by the third-party client to the third-party application server may further carry an identifier of the intelligent hardware if the target operation is a login operation. Correspondingly, a processing process may be as follows: The third-party application client may send an identifier obtaining request to the intelligent hardware after obtaining the operation indication for requesting to perform the login operation. The identifier obtaining request is used to request to obtain the identifier of the intelligent hardware. The intelligent hardware may send the identifier of the intelligent hardware to the third-party application client after receiving the identifier obtaining request sent by the third-party application client. The third-party application client may receive the identifier of the intelligent hardware sent by the intelligent hardware, and send a login request to the third-party application server. The login request includes login request information and the identifier of the intelligent hardware. The login request information is used to request the third-party application server to log in to a target user account in the third-party application. The target user account is the user account that is in the third-party application and is bound to the identifier of the intelligent hardware.

Optionally, the third-party application client may send a payment request to the third-party application server after obtaining the operation indication for requesting to perform the payment operation if the target operation is a payment operation. The payment request includes payment request information. The payment request information is used to request the third-party application server to complete a payment procedure of a target order. The target order is an order that is generated and sent to the third-party application server before execution of a payment operation is requested.

The requesting, by the third-party application server, to obtain to-be-signed information from an authentication server after an operation request sent by the third-party application client is received includes the following step 302 to step 306.

Step 302: The third-party application server obtains an identifier of intelligent hardware.

The identifier of the intelligent hardware may be provided by the third-party application client to the third-party application server if the target operation is a login operation. According to the method described in 301, the third-party application client may obtain the identifier of the intelligent hardware from the intelligent hardware after obtaining the operation indication for requesting to perform the login operation, and further, send the login request that carries the identifier of the intelligent hardware to the third-party application server. The third-party application server may parse the login request after receiving the login request sent by the third-party client, to obtain the identifier of the intelligent hardware.

The third-party application server may perform a search according to a second binding relationship stored in advance to obtain the identifier of the intelligent hardware in a binding relationship with the user account that is currently logged in to because the user account in the third-party application client is already in a login state if the target operation is a payment operation. The second binding relationship is stored by the third-party application server in a registration and binding procedure. For the registration and binding procedure, refer to the following introduction and description. In another possible implementation, the identifier of the intelligent hardware may alternatively be provided by the third-party application client to the third-party application server. For example, the payment request carries the identifier of the intelligent hardware.

Step 303: The third-party application server sends an authentication request to an authentication server.

The authentication request at least includes authentication request information and the identifier of the intelligent hardware, and the authentication request information is used to request the authentication server to generate the to-be-signed information.

Optionally, the authentication request further includes an identifier of a third-party application. One piece of intelligent hardware may be bound to a plurality of different third-party applications, that is, to user accounts in a plurality of different third-party applications. Therefore, to distinguish the third-party applications, the third-party application server adds an identifier of a third-party application to the authentication request.

Optionally, the authentication request further includes order information if the target operation is a payment operation. The order information may include an order number and transaction key information such as a transaction amount, a store name, a transaction time, an item name, and an item quantity.

Correspondingly, the authentication server receives the authentication request sent by the third-party application server.

Optionally, the third-party application server may store the second binding relationship between the identifier of the intelligent hardware and the user account of the third-party application in advance. In this case, the third-party application server may determine whether the second binding relationship includes a binding relationship between the identifier of the intelligent hardware and the user account of the third-party application after obtaining a hardware identifier of the intelligent hardware. The third-party application server may send the authentication request to the authentication server if the binding relationship between the identifier of the intelligent hardware and the user account of the third-party application is stored.

Step 304: The authentication server obtains an availability status of the intelligent hardware according to the identifier of the intelligent hardware.

The availability status may include a bound state, an unbound state, and a loss-reporting state. The bound state means that a user account that is of the third-party application and is in the binding relationship with the identifier of the intelligent hardware is currently recorded. The unbound state means that a user account that is of the third-party application and is in the binding relationship with the identifier of the intelligent hardware is currently not recorded. The loss-reporting state is that currently none of user accounts that are of all the third-party applications and are in the binding relationship with the identifier of the intelligent hardware is recorded. It may indicate that the intelligent hardware is available if the availability status of the intelligent hardware is in a bound state. It indicates that the intelligent hardware is unavailable if the availability status of the intelligent hardware is an unbound state or a loss-reporting state.

Step 305: The authentication server generates to-be-signed information if the availability status of the intelligent hardware indicates that the intelligent hardware is available.

Optionally, the to-be-signed information includes a challenge random number (challenge parameter). The challenge random number may be any preset number or may be any number randomly generated by the authentication server according to a preset rule. Optionally, the to-be-signed information further includes an application parameter. The application parameter corresponds to the third-party application.

The to-be-signed information may include a challenge random number and the application parameter if the target operation is a login operation. The to-be-signed information may include a challenge random number, an application parameter, order information, a time stamp, and the like if the target operation is a payment operation.

Step 306: The authentication server sends the to-be-signed information to the third-party application server.

Correspondingly, the third-party application server receives the to-be-signed information sent by the authentication server.

In addition, the authentication server does not perform any operation or sends feedback information for indicating that the intelligent hardware is unavailable to the third-party application server if the availability status of the intelligent hardware indicates that the intelligent hardware is unavailable. Correspondingly, when the authentication server does not perform any operation if the availability status of the intelligent hardware indicates that the intelligent hardware is unavailable, the third-party application server may feed back a failure indication to the third-party application client if failing to receiving the to-be-signed information within preset duration after the authentication request is sent. When the authentication server sends the feedback information for indicating that the intelligent hardware is unavailable to the third-party application server if the availability status of the intelligent hardware indicates that the intelligent hardware is unavailable, the third-party application server may feed back a failure indication to the third-party application client after receiving the foregoing feedback information. The third-party application client may send, according to a preset prompt manner, a prompt signal indicating that the target operation fails to be performed after receiving the failure indication. The prompt signal may be sent in a text form, a speech form or a vibration form (where a vibration prompt signal may be sent according to preset vibration strength and a preset vibration quantity or sent according to preset vibration strength, a vibration quantity, and a vibration strength change trend).

Step 307: The third-party application server forwards the to-be-signed information to the intelligent hardware by using the third-party application client.

In this step, the third-party application client transparently transmits the to-be-signed information.

Correspondingly, the intelligent hardware receives the to-be-signed information forwarded by the third-party application server by using the third-party application client.

Step 308: The intelligent hardware generates confirmation prompt information.

The confirmation prompt information is used to query whether to confirm execution of the target operation. For example, the confirmation prompt information may be used to query whether the user confirms login to the third-party application if the target operation is a login operation. For another example, the confirmation prompt information may be used to query whether the user confirms a payment target order if the target operation is a payment operation. In these example embodiments, a prompt manner of the confirmation prompt information is not limited, and is, for example, a displayed prompt, a sound and light prompt, a vibration prompt or a speech prompt.

Step 309: The intelligent hardware obtains a confirmation indication corresponding to the confirmation prompt information.

The user may perform an operation to trigger the intelligent hardware to obtain a corresponding confirmation indication if the user confirms execution of the target operation after obtaining the confirmation prompt information. For example, the user may press a confirmation button, scan a fingerprint, scan an iris or perform another operation to trigger the intelligent hardware to obtain the corresponding confirmation indication.

Optionally, the user may alternatively use biometric information to trigger the intelligent hardware to obtain the confirmation indication. After obtaining the confirmation prompt information, the intelligent hardware may turn on a biometric information collection function to collect biometric information of the user. The intelligent hardware may verify the biometric information after collecting the biometric information. The intelligent hardware may be triggered to obtain the confirmation indication corresponding to the confirmation prompt information when verification of the collected biometric information succeeds. For example, the intelligent hardware may store reference biometric information in advance. The intelligent hardware collects the biometric information and may then compare the collected biometric information with the reference biometric information stored in advance. The intelligent hardware may be triggered to obtain the confirmation indication corresponding to the confirmation prompt information when the collected biometric information matches the reference biometric information. The biometric information includes, but is not limited to, any one of a fingerprint, an iris, a retina, a gene, a sound, a human face, hand geometry, a vein, a gait, and handwriting. The biometric information of the user is unique, and the identity of an operator can be verified by using the foregoing manner, to avoid false confirmation after the intelligent hardware is maliciously acquired by another person, thereby improving the security.

The intelligent hardware performs the following step 310 after obtaining the confirmation indication corresponding to the confirmation prompt information, or otherwise does not perform the following step 310 if failing to obtain the confirmation indication.

Step 310: The intelligent hardware signs the to-be-signed information by using an application private key corresponding to the third-party application, to obtain a first signature result.

The application private key corresponding to the third-party application is generated by the intelligent hardware in the registration and binding procedure.

Optionally, the second binding relationship may further record an application key index. In this case, after the requesting, by the third-party application server, to obtain to-be-signed information from an authentication server, the following steps may further be performed: searching, by the third-party application server, the second binding relationship to obtain the corresponding application key index according to the identifier of the intelligent hardware or the user account, and sending the application key index to the intelligent hardware by using the third-party application client. The intelligent hardware may obtain the application private key corresponding to the third-party application according to the application key index after receiving the application key index sent by using the third-party application client by the third-party application server. The second binding relationship includes a binding relationship among the identifier of the intelligent hardware, the user account, and the application key index, and the second binding relationship is stored by the third-party application server in the registration and binding procedure. The application key index is generated by the intelligent hardware in the registration and binding procedure, and is used to index an application public key corresponding to the third-party application and the application private key. The intelligent hardware detects whether a corresponding application private key exists by using the application key index, so that the third-party application server can be verified, thereby improving the security.

Step 311: The intelligent hardware transparently transmits the first signature result to the authentication server by using the third-party application client and the third-party application server sequentially.

Correspondingly, the authentication server receives the first signature result transparently transmitted by using the third-party application client and the third-party application server sequentially by the intelligent hardware.

Step 312: The authentication server verifies whether the first signature result is correct by using an application public key corresponding to the third-party application.

The application public key corresponding to the third-party application is generated by the intelligent hardware in the registration and binding procedure. The authentication server in the registration and binding procedure stores a first binding relationship. The first binding relationship at least includes a binding relationship among the identifier of the intelligent hardware, the user account, and the application public key corresponding to the third-party application. The authentication server may search the first binding relationship stored in advance to obtain the application public key that is bound to the identifier of the intelligent hardware and corresponds to the third-party application after receiving the first signature result, and may further use the application public key corresponding to the third-party application to verify the first signature result.

Step 313: The authentication server sends a verification success indication to the third-party application server if the first signature result is correct. That is, the authentication server may send the verification success indication to the third-party application server if determining that the first signature result is actually obtained by the intelligent hardware by signing the to-be-signed information sent by the authentication server by using the application private key.

Correspondingly, the third-party application server receives the verification success indication sent by the authentication server.

Step 314: The third-party application server performs the target operation after receiving the verification success indication.

The third-party application server sets the user account bound to the identifier of the intelligent hardware from a non-login state to a login state if the target operation is a login operation, so that the intelligent hardware can be used to log in to the third-party client without requiring the user to input a user account and a password.

The third-party application server completes a payment procedure of a target order corresponding to the order information if the target operation is a payment operation, so that the intelligent hardware can be used to make payment of the third-party client without requiring the user to input a payment password.

Optionally, the intelligent hardware may further count a quantity of times that the application private key corresponding to the third-party application is referenced. Correspondingly, the foregoing step 310 may be replaced by the following steps for implementation: obtaining, by the intelligent hardware, a value of a counter, where the counter is used to count the quantity of times that the application private key corresponding to the third-party application is referenced; and signing, by the intelligent hardware, the to-be-signed information and the value of the counter by using the application private key corresponding to the third-party application, to obtain the first signature result. Correspondingly, the foregoing step 311 may be replaced by the following step for implementation if the intelligent hardware signs the to-be-signed information and the value of the counter: transparently transmitting, by the intelligent hardware, the first signature result and the value of the counter to the authentication server by using the third-party application client and the third-party application server sequentially. Correspondingly, the authentication server receives the first signature result and the value of the counter that are transparently transmitted by using the third-party application client and the third-party application server sequentially by the intelligent hardware. In addition, the value of the counter may be increased by 1 every time after the intelligent hardware uses an application key to sign the to-be-signed information.

To sum up, in the method provided in these example embodiments, intelligent hardware signs to-be-signed information to obtain a first signature result, and an authentication server instructs a third-party application server to perform a target operation when verifying that the first signature result is correct. The problem that operations are complex and inefficient when a user performs a network operation that requires identity authentication because the user needs to manually input related information for identity authentication in an existing identity authentication manner is resolved. The intelligent hardware is used to implement identity authentication, the user does not need to manually input related information for identity authentication, so that it is more convenient and efficient for the user to perform a network operation that requires identity authentication.

Figure 4:
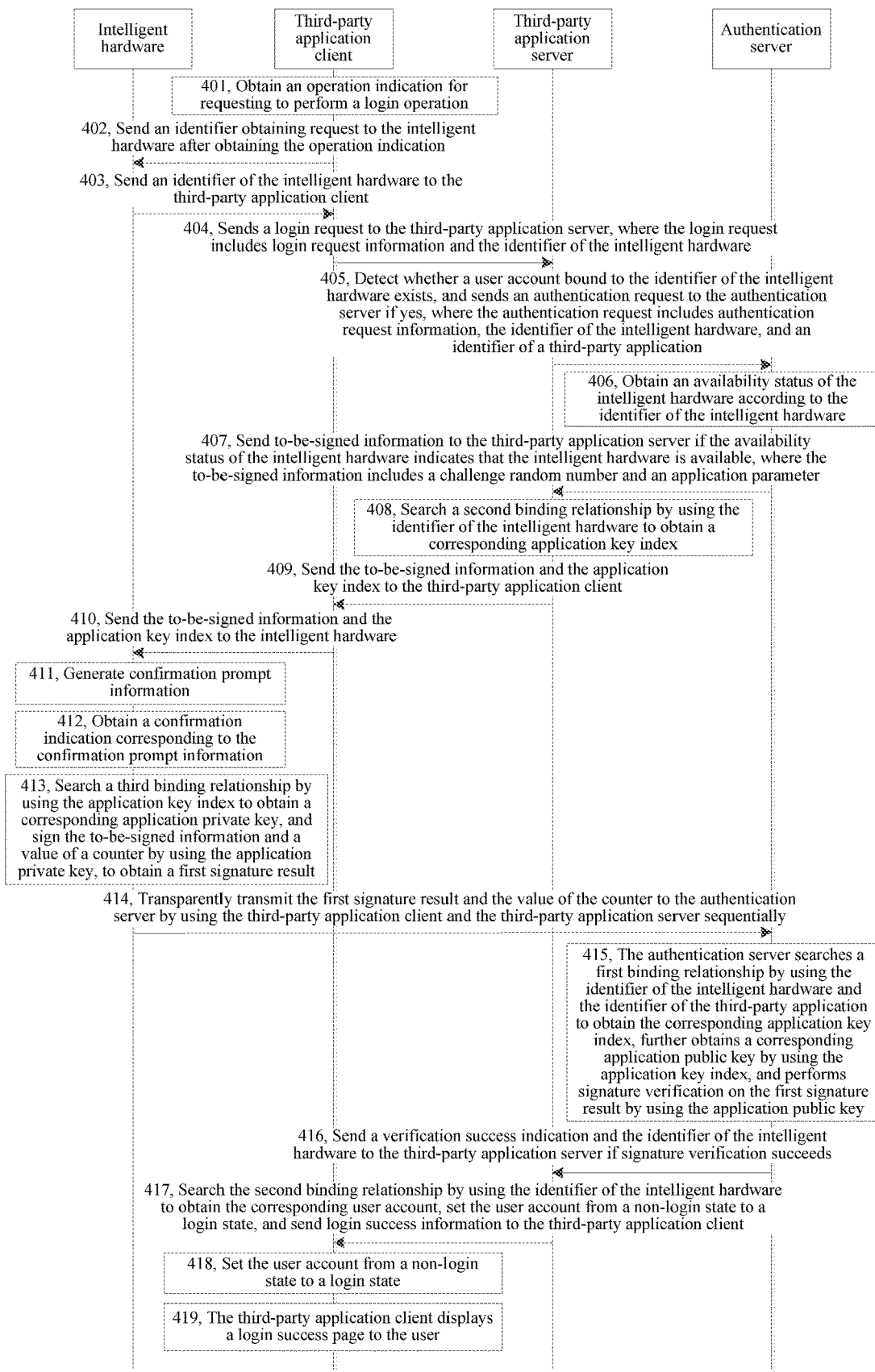
FIG. 4 is a flowchart of an identity authentication method according to example embodiments.

FIG. 4 is a flowchart of an identity authentication method according to example embodiments. In these example embodiments, a target operation is a login operation, and a login procedure is introduced and described. The method may include several steps as follows:

Step 401: A user selects an intelligent hardware manner in a third-party application client to perform login.

Correspondingly, the third-party application client obtains an operation indication for requesting to perform a login operation.

Step 402: The third-party application client sends an identifier obtaining request to the intelligent hardware after obtaining the operation indication.

Correspondingly, the intelligent hardware receives the identifier obtaining request sent by the third-party application client.

Step 403: The intelligent hardware sends an identifier of the intelligent hardware to the third-party application client.

Correspondingly, the third-party application client receives the identifier of the intelligent hardware sent by the intelligent hardware.

Step 404: The third-party application client sends a login request to a third-party application server, where the login request includes login request information and the identifier of the intelligent hardware.

Correspondingly, the third-party application server receives the login request sent by the third-party application client.

Step 405: The third-party application server detects whether a user account bound to the identifier of the intelligent hardware exists, and sends an authentication request to an authentication server if yes, where the authentication request includes authentication request information, the identifier of the intelligent hardware, and an identifier of a third-party application.

Correspondingly, the authentication server receives the authentication request sent by the third-party application server.

Step 406: The authentication server obtains an availability status of the intelligent hardware according to the identifier of the intelligent hardware.

Step 407: The authentication server sends to-be-signed information to the third-party application server if the availability status of the intelligent hardware indicates that the intelligent hardware is available, where the to-be-signed information includes a challenge random number and an application parameter.

Correspondingly, the third-party application server receives the to-be-signed information sent by the authentication server.

Step 408: The third-party application server searches a second binding relationship by using the identifier of the intelligent hardware to obtain a corresponding application key index.

Step 409: The third-party application server sends the to-be-signed information and the application key index to the third-party application client.

Correspondingly, the third-party application client receives the to-be-signed information and the application key index that are sent by the third-party application server.

Step 410: The third-party application client sends the to-be-signed information and the application key index to the intelligent hardware.

Correspondingly, the intelligent hardware receives the to-be-signed information and the application key index that are sent by the third-party application client.

Step 411: The intelligent hardware generates confirmation prompt information.

Step 412: The intelligent hardware obtains a confirmation indication corresponding to the confirmation prompt information.

Step 413: The intelligent hardware searches a third binding relationship by using the application key index to obtain a corresponding application private key, and signs the to-be-signed information and a value of a counter by using the application private key, to obtain a first signature result.

Step 414: The intelligent hardware transparently transmits the first signature result and the value of the counter to the authentication server by using the third-party application client and the third-party application server sequentially.

Correspondingly, the authentication server receives the first signature result and the value of the counter that are transparently transmitted by using the third-party application client and the third-party application server sequentially by the intelligent hardware.

Step 415: The authentication server searches a first binding relationship by using the identifier of the intelligent hardware and the identifier of the third-party application to obtain the corresponding application key index, further obtains a corresponding application public key by using the application key index, and performs signature verification on the first signature result by using the application public key.

Step 416: The authentication server sends a verification success indication and the identifier of the intelligent hardware to the third-party application server if signature verification succeeds.

Correspondingly, the third-party application server receives the verification success indication and the identifier of the intelligent hardware that are sent by the authentication server.

Step 417: The third-party application server searches the second binding relationship by using the identifier of the intelligent hardware to obtain the corresponding user account, sets the user account from a non-login state to a login state, and sends login success information to the third-party application client.

The login success information may carry the user account.

Correspondingly, the third-party application client receives the login success information sent by the third-party application server.

Step 418: The third-party application client sets the user account from a non-login state to a login state.

Step 419: The third-party application client displays a login success page to the user.

By using the method provided in these example embodiments, a user may use intelligent hardware to complete an account login without needing to input a user account and a password, and a login process is convenient and efficient. Because the intelligent hardware is more secure than a third-party application client, the security of the login process is ensured.

Figure 5:
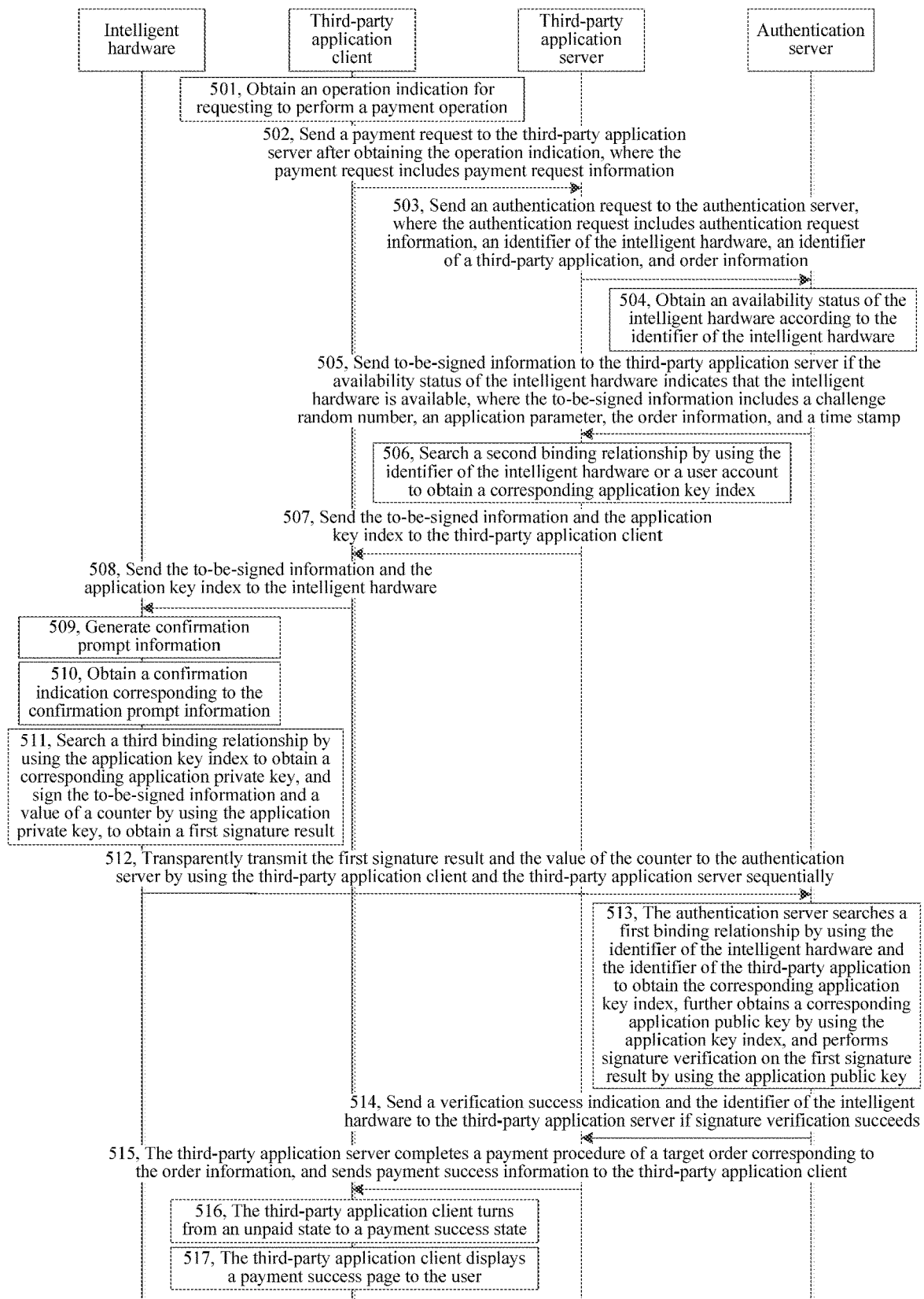
FIG. 5 is a flowchart of an identity authentication method according to example embodiments.

FIG. 5 is a flowchart of an identity authentication method according to example embodiments. In these example embodiments, a target operation is a payment operation, and a payment procedure is introduced and described. The method may include several steps as follows:

Step 501: A user selects an intelligent hardware manner in a third-party application client to make payment.

Correspondingly, the third-party application client obtains an operation indication for requesting to perform the payment operation.

Step 502: The third-party application client sends a payment request to a third-party application server after obtaining the operation indication, where the payment request includes payment request information.

Correspondingly, the third-party application server receives the payment request sent by the third-party application client.

Step 503: The third-party application server sends an authentication request to an authentication server, where the authentication request includes authentication request information, an identifier of the intelligent hardware, an identifier of a third-party application, and order information.

Correspondingly, the authentication server receives the authentication request sent by the third-party application server.

Step 504: The authentication server obtains an availability status of the intelligent hardware according to the identifier of the intelligent hardware.

Step 505: The authentication server sends to-be-signed information to the third-party application server if the availability status of the intelligent hardware indicates that the intelligent hardware is available, where the to-be-signed information includes a challenge random number, an application parameter, the order information, and a time stamp.

Correspondingly, the third-party application server receives the to-be-signed information sent by the authentication server.

Step 506: The third-party application server searches a second binding relationship by using the identifier of the intelligent hardware or a user account to obtain a corresponding application key index.

Step 507: The third-party application server sends the to-be-signed information and the application key index to the third-party application client.

Correspondingly, the third-party application client receives the to-be-signed information and the application key index that are sent by the third-party application server.

Step 508: The third-party application client sends the to-be-signed information and the application key index to the intelligent hardware.

Correspondingly, the intelligent hardware receives the to-be-signed information and the application key index that are sent by the third-party application client.

Step 509: The intelligent hardware generates confirmation prompt information.

The confirmation prompt information may include transaction key information such as a transaction amount, a store name, and a transaction time that is retrieved from the order information.

Step 510: The intelligent hardware obtains a confirmation indication corresponding to the confirmation prompt information.

Optionally, a second verification measure may be added if the transaction amount is greater than a preset value, and is, for example, prompting the user to input a password. The form of the password may be a number, a fingerprint, an iris, and the like.

Step 511: The intelligent hardware searches a third binding relationship by using the application key index to obtain a corresponding application private key, and signs the to-be-signed information and a value of a counter by using the application private key, to obtain a first signature result.

The to-be-signed information in this step may include only a challenge random number and the application parameter. That is, the intelligent hardware signs the challenge random number, the application parameter, and the value of the counter by using the application private key.

Step 512: The intelligent hardware transparently transmits the first signature result and the value of the counter to the authentication server by using the third-party application client and the third-party application server sequentially.

Correspondingly, the authentication server receives the first signature result and the value of the counter that are transparently transmitted by using the third-party application client and the third-party application server sequentially by the intelligent hardware.

Step 513: The authentication server searches a first binding relationship by using the identifier of the intelligent hardware and the identifier of the third-party application to obtain the corresponding application key index, further obtains a corresponding application public key by using the application key index, and performs signature verification on the first signature result by using the application public key.

Step 514: The authentication server sends a verification success indication and the order information to the third-party application server if signature verification succeeds.

Correspondingly, the third-party application server receives the verification success indication and the order information that are sent by the authentication server.

Step 515: The third-party application server completes a payment procedure of a target order corresponding to the order information, and sends payment success information to the third-party application client.

Correspondingly, the third-party application client receives the payment success information sent by the third-party application server.

Step 516: The third-party application client turns from an unpaid state to a payment success state.

Step 517: The third-party application client displays a payment success page to the user.

By using the method provided in these example embodiments, a user may use intelligent hardware to complete order payment without needing to input a payment password, and a login process is convenient and efficient. The intelligent hardware is more secure than a third-party application client, so that the security of a payment process is ensured.

A registration and binding procedure is introduced and described below by using example embodiment shown in FIG. 6.

Figure 6:
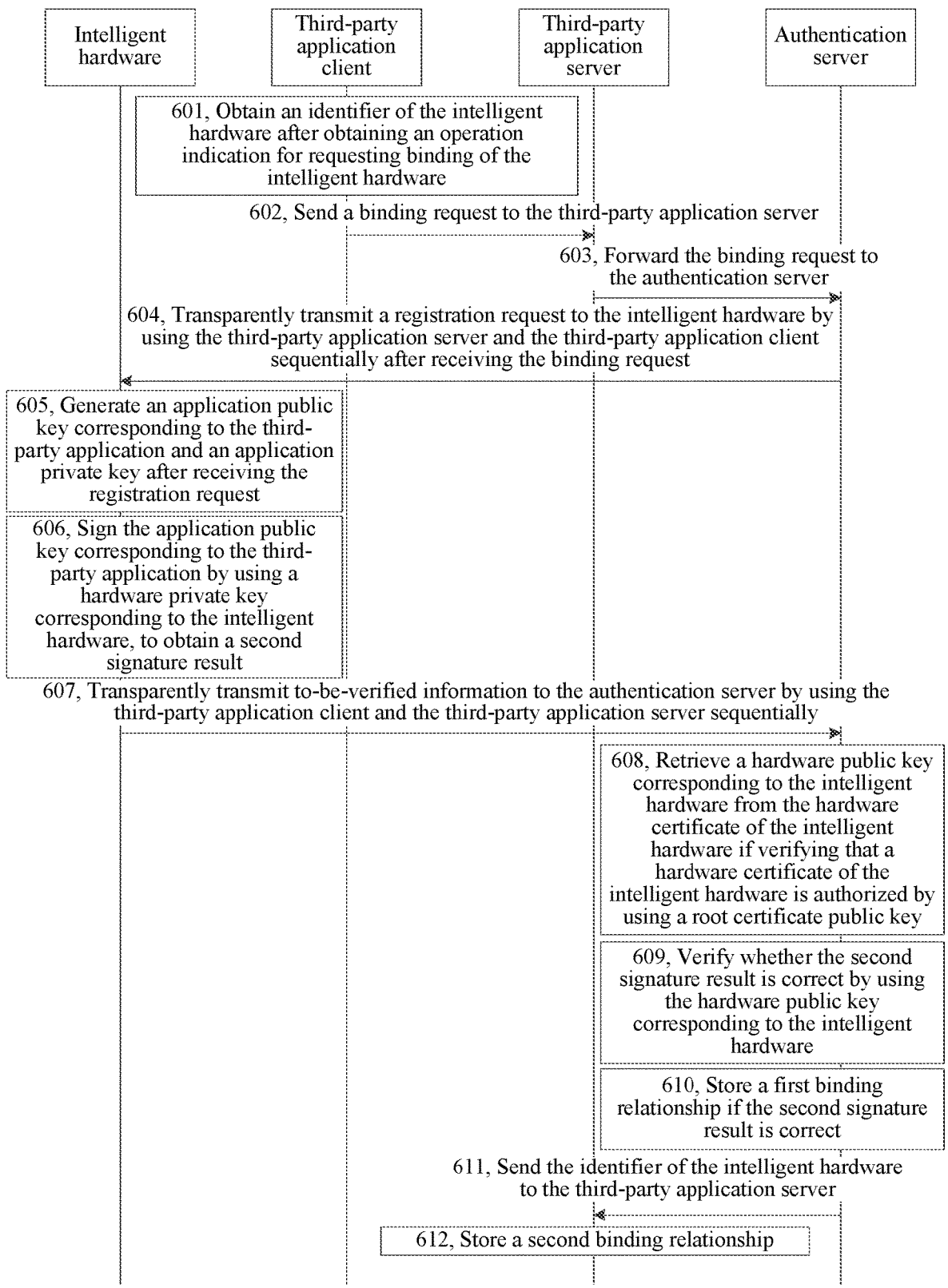
FIG. 6 is a flowchart of a registration and binding method according to example embodiments.

FIG. 6 is a flowchart of a registration and binding method according to example embodiments. The method may be applied to the implementation environment shown in FIG. 1. The method may include several steps as follows:

Step 601: A third-party application client obtains an identifier of the intelligent hardware after obtaining an operation indication for requesting binding of the intelligent hardware.

A user may perform an operation to trigger to establish a binding relationship between a user account of a third-party application and the identifier of the intelligent hardware before using an intelligent hardware manner to trigger a third-party application server perform a target operation. The user may log in to the user account of the third-party application by using a login method (for example, a method of manually inputting a user account and a key) in the related technology, and may further perform an operation to trigger the third-party application client to obtain an operation indication for requesting binding of the intelligent hardware. The third-party application client may send an identifier obtaining request to the intelligent hardware after obtaining the operation indication for requesting binding of the intelligent hardware. The identifier obtaining request is used to request to obtain the identifier of the intelligent hardware. The intelligent hardware sends the identifier of the intelligent hardware to the third-party application client after receiving the identifier obtaining request sent by the third-party application client. The third-party application client receives the identifier of the intelligent hardware sent by the intelligent hardware.

In an actual application, for one third-party application, it is supported that one piece of intelligent hardware may be bound to one user account in the third-party application. That is, for each third-party application, the identifier of the intelligent hardware corresponds to the user account of the third-party application one by one. For a plurality of different third-party applications, it is supported that one piece of intelligent hardware may be bound to a plurality of different third-party applications, that is, bound to user accounts in a plurality of different the third-party application.

Step 602: The third-party application client sends a binding request to a third-party application server.

The binding request includes binding request information and the identifier of the intelligent hardware, and the binding request information is used to request establishment of the binding relationship between the identifier of the intelligent hardware and the user account that is used to log in to the third-party application client.

Correspondingly, the third-party application server receives the binding request sent by the third-party application client.

Step 603: The third-party application server forwards the binding request to an authentication server.

The binding request at least includes the binding request information and the identifier of the intelligent hardware.

Correspondingly, the authentication server receives the binding request forwarded by the third-party application server.

Optionally, the third-party application server may further add an identifier of the third-party application to the binding request when sending the binding request to the authentication server. That is, the binding request sent by the third-party application server to the authentication server may further carry the identifier of the third-party application.

Step 604: The authentication server transparently transmits a registration request to the intelligent hardware by using the third-party application server and the third-party application client sequentially after receiving the binding request.

The registration request is used to instruct the intelligent hardware to generate an application key corresponding to the third-party application. Optionally, the registration request includes registration request information and an application parameter. The registration request information is used to instruct the intelligent hardware to generate the application key corresponding to the third-party application. The application parameter corresponds to the third-party application. Optionally, the registration request further includes a challenge random number. The challenge random number is randomly generated by the authentication server according to a preset rule.

Correspondingly, the intelligent hardware receives, by using the third-party application server and the third-party application client sequentially, the registration request transparently transmitted by the authentication server.

If the binding request sent by the third-party application server to the authentication server further carries the identifier of the third-party application, the authentication server may further determine whether the binding relationship between the identifier of the intelligent hardware and the user account of the third-party application corresponding to the identifier of the third-party application is currently recorded in the authentication server after receiving the binding request. The authentication server transparently transmits the registration request to the intelligent hardware by using the third-party application server and the third-party application client sequentially if the binding relationship between the identifier of the intelligent hardware and the user account of the third-party application is currently not recorded in the authentication server. The authentication server may perform no processing or may send a registration failure indication to the third-party client by using the third-party application server if the binding relationship between the identifier of the intelligent hardware and the user account of the third-party application is currently recorded in the authentication server. If the authentication server sends the registration failure indication to the third-party client by using a third-party server, the third-party client may receive the registration failure indication sent by the authentication server.

Step 605: The intelligent hardware generates an application public key and an application private key corresponding to the third-party application after receiving the registration request.

Step 606: The intelligent hardware signs the application public key corresponding to the third-party application by using a hardware private key corresponding to the intelligent hardware, to obtain a second signature result.

Step 607: The intelligent hardware transparently transmits to-be-verified information to the authentication server by using the third-party application client and the third-party application server sequentially.

The to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware.

Correspondingly, the authentication server receives, by using the third-party application client and the third-party application server sequentially, the to-be-verified information transparently transmitted by the intelligent hardware.

Optionally, the intelligent hardware may correspondingly further perform the following steps after receiving the registration request if an application key index further exists in the foregoing second binding relationship: generating, by the intelligent hardware, the application key index, where the application key index is used to index the application public key corresponding to the third-party application and the application private key; and sending, by the intelligent hardware, the application key index to the authentication server by using the third-party application client and the third-party application server sequentially. Optionally, the application key index may be signed by using the hardware private key corresponding to the intelligent hardware and then sent to the authentication server. The registration request sent by the authentication server to the intelligent hardware may further include the application parameter. In this case, a processing process in which the intelligent hardware generates the application key index may be as follows: generating, by the intelligent hardware, a digest value of the application parameter and the application private key corresponding to the third-party application; generating, by the intelligent hardware, a random number; and generating, by the intelligent hardware, the application key index according to the digest value and the random number.

Step 608: The authentication server retrieves a hardware public key corresponding to the intelligent hardware from a hardware certificate of the intelligent hardware if verifying that the hardware certificate of the intelligent hardware is authorized by using a root certificate public key.

Step 609: The authentication server verifies whether the second signature result is correct by using the hardware public key corresponding to the intelligent hardware.

Step 610: The authentication server stores a first binding relationship if the second signature result is correct.

The first binding relationship includes a binding relationship among the identifier of the intelligent hardware, the user account, and the application public key corresponding to the third-party application. Optionally, the first binding relationship further includes the identifier of the third-party application.

Step 611: The authentication server sends the identifier of the intelligent hardware to the third-party application server.

Correspondingly, the third-party application server receives the identifier of the intelligent hardware sent by the authentication server.

Step 612: The third-party application server stores a second binding relationship.

The second binding relationship includes a binding relationship between the identifier of the intelligent hardware and the user account.

In addition, the first binding relationship stored in the authentication server includes a binding relationship among the identifier of the intelligent hardware, the user account, the application key index, and the application public key corresponding to the third-party application if the authentication server further obtains the application key index. The authentication server further sends the application key index to the third-party application server after verifying that the second signature result is correct. Correspondingly, the second binding relationship stored by the third-party application server includes a binding relationship among the identifier of the intelligent hardware, the user account, and the application key index.

In the method provided in these example embodiments, a hardware certificate is a certificate that is issued by an authentication server by using a system root certificate and is stored intelligent hardware, the system root certificate is used as a trust root to authenticate the intelligent hardware to ensure the authenticity of the intelligent hardware and ensure secure transmission of an application public key, a secure and stable system is better implemented.

Figure 7:
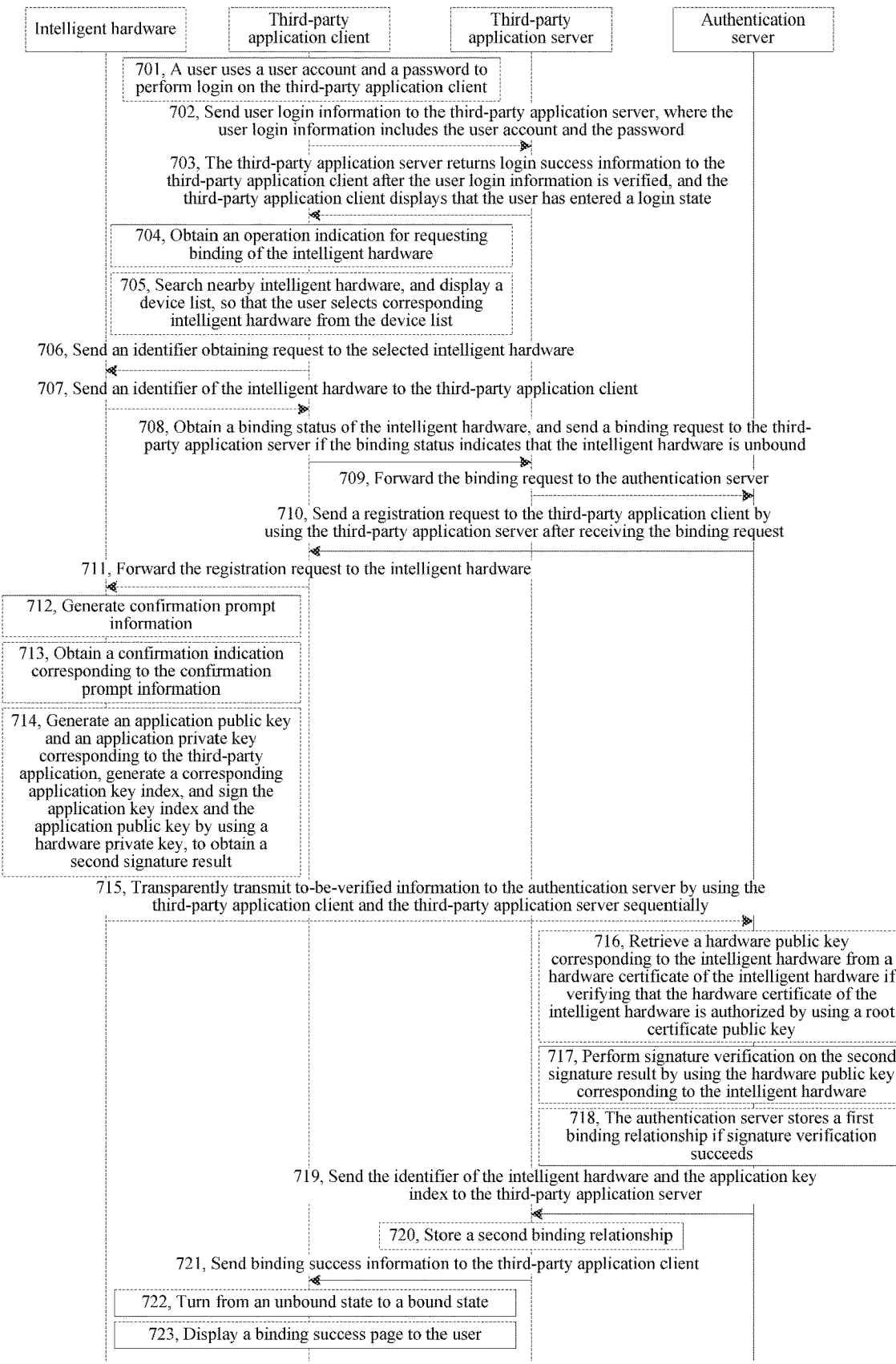
FIG. 7 is a flowchart of a registration and binding method according to example embodiments.

FIG. 7 is a flowchart of a registration and binding method according to example embodiments. The method may include several steps as follows:

Step 701: A user uses a user account and a password to perform login on a third-party application client.

Step 702: The third-party application client sends user login information to a third-party application server, where the user login information includes the user account and the password.

Correspondingly, the third-party application server receives the user login information sent by the third-party application client.

Step 703: The third-party application server returns login success information to the third-party application client after the user login information is verified, and the third-party application client displays that the user has entered a login state.

Step 704: The user selects to bind intelligent hardware in the third-party application client after successfully logging in to the third-party application client.

Correspondingly, the third-party application client obtains an operation indication for requesting binding of the intelligent hardware.

Step 705: The third-party application client searches nearby intelligent hardware, and displays a device list, so that the user selects corresponding intelligent hardware from the device list.

The device list includes nearby intelligent hardware found by the third-party application client.

Step 706: The third-party application client sends an identifier obtaining request to the selected intelligent hardware.

The identifier obtaining request is used to request to obtain an identifier of the intelligent hardware.

Correspondingly, the intelligent hardware receives the identifier obtaining request sent by the third-party application client.

Step 707: The intelligent hardware sends an identifier of the intelligent hardware to the third-party application client.

Correspondingly, the third-party application client receives the identifier of the intelligent hardware sent by the intelligent hardware.

Step 708: The third-party application client obtains a binding status of the intelligent hardware, and sends a binding request to the third-party application server if the binding status indicates that the intelligent hardware is unbound.

The binding request includes binding request information and the identifier of the intelligent hardware, and the binding request information is used to request establishment of a binding relationship between the intelligent hardware and the user account that is used to log in to the third-party application client. The binding status of the intelligent hardware may be sent by the intelligent hardware to the third-party application client.

Correspondingly, the third-party application server receives the binding request sent by the third-party application client.

In addition, a registration and binding procedure ends if the binding status indicates that the intelligent hardware is bound.

Step 709: The third-party application server forwards the binding request to an authentication server.

The binding request includes the binding request information, the identifier of the intelligent hardware, and an identifier of a third-party application.

Correspondingly, the authentication server receives the binding request forwarded by the third-party application server.

Step 710: The authentication server sends a registration request to the third-party application client by using the third-party application server after receiving the binding request.

The registration request includes registration request information, a challenge random number, and an application parameter.

Correspondingly, the third-party application client receives, by using the third-party application server, the registration request sent by the authentication server.

Step 711: The third-party application client forwards the registration request to the intelligent hardware.

Correspondingly, the intelligent hardware receives the registration request forwarded by the third-party application client.

Step 712: The intelligent hardware generates confirmation prompt information.

In these example embodiments, the confirmation prompt information is used to query whether to confirm binding of the intelligent hardware.

Step 713: The intelligent hardware obtains a confirmation indication corresponding to the confirmation prompt information.

The user triggers the confirmation indication if confirming binding of the intelligent hardware after obtaining the confirmation prompt information. For example, the user presses a confirmation button, scans a fingerprint, scans an iris, or performs another operation to trigger the confirmation indication.

Step 714: The intelligent hardware generates an application public key and an application private key corresponding to the third-party application, generates a corresponding application key index, and signs the application key index and the application public key by using a hardware private key, to obtain a second signature result.

Step 715: The intelligent hardware transparently transmits to-be-verified information to the authentication server by using the third-party application client and the third-party application server sequentially.

The to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware.

Correspondingly, the authentication server receives, by using the third-party application client and the third-party application server sequentially, the to-be-verified information transparently transmitted by the intelligent hardware.

Step 716: The authentication server retrieves a hardware public key corresponding to the intelligent hardware from a hardware certificate of the intelligent hardware if verifying that the hardware certificate of the intelligent hardware is authorized by using a root certificate public key.

Step 717: The authentication server performs signature verification on the second signature result by using the hardware public key corresponding to the intelligent hardware.

Step 718: The authentication server stores a first binding relationship if signature verification succeeds.

The first binding relationship includes a binding relationship among the identifier of the intelligent hardware, the identifier of the third-party application, the user account, the application key index, and the application public key corresponding to the third-party application.

Step 719: The authentication server sends the identifier of the intelligent hardware and the application key index to the third-party application server.

Correspondingly, the third-party application server receives the identifier of the intelligent hardware and the application key index that are sent by the authentication server.

Step 720: The third-party application server stores a second binding relationship.

The second binding relationship includes a binding relationship among the identifier of the intelligent hardware, the user account, and the application key index. The third-party application server stores the second binding relationship, and is configured to perform identity authentication when subsequently the user uses the intelligent hardware to perform login and make payment.

Step 721: The third-party application server sends binding success information to the third-party application client.

Correspondingly, the third-party application client receives the binding success information sent by the third-party application server.

Step 722: The third-party application client turns from an unbound state to a bound state.

Step 723: The third-party application client displays a binding success page to the user.

Figure 8:
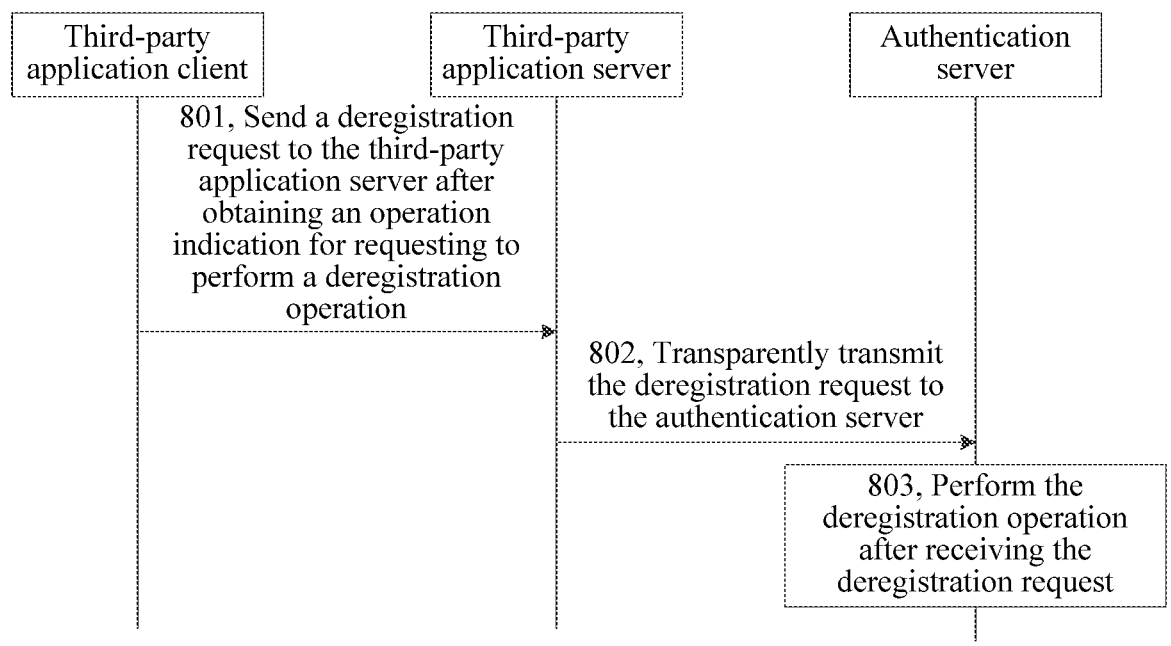
FIG. 8 is a flowchart of a deregistration method according to example embodiments.

FIG. 8, FIG. 8 is a flowchart of a deregistration method according to example embodiments. The method may be applied to the implementation environment shown in FIG. 1. The method may include several steps as follows:

Step 801: A third-party application client sends a deregistration request to a third-party application server after obtaining an operation indication for requesting to perform a deregistration operation.

The deregistration request at least includes deregistration request information and an identifier of intelligent hardware. The deregistration request information is used to request execution of the deregistration operation, and the deregistration operation is an unbinding operation or a loss-reporting operation. The unbinding operation is to release a binding relationship between the intelligent hardware and a user account. The loss-reporting operation is to report a loss of the intelligent hardware.

Correspondingly, the third-party application server receives the deregistration request sent by the third-party application client.

Step 802: The third-party application server transparently transmits the deregistration request to an authentication server.

Correspondingly, the authentication server receives the deregistration request transparently transmitted by the third-party application server.

Step 803: The authentication server performs the deregistration operation after receiving the deregistration request.

In the method provided in these example embodiments, unbinding between the intelligent hardware and the user account and loss-reporting of the intelligent hardware are implemented.

Figure 9:
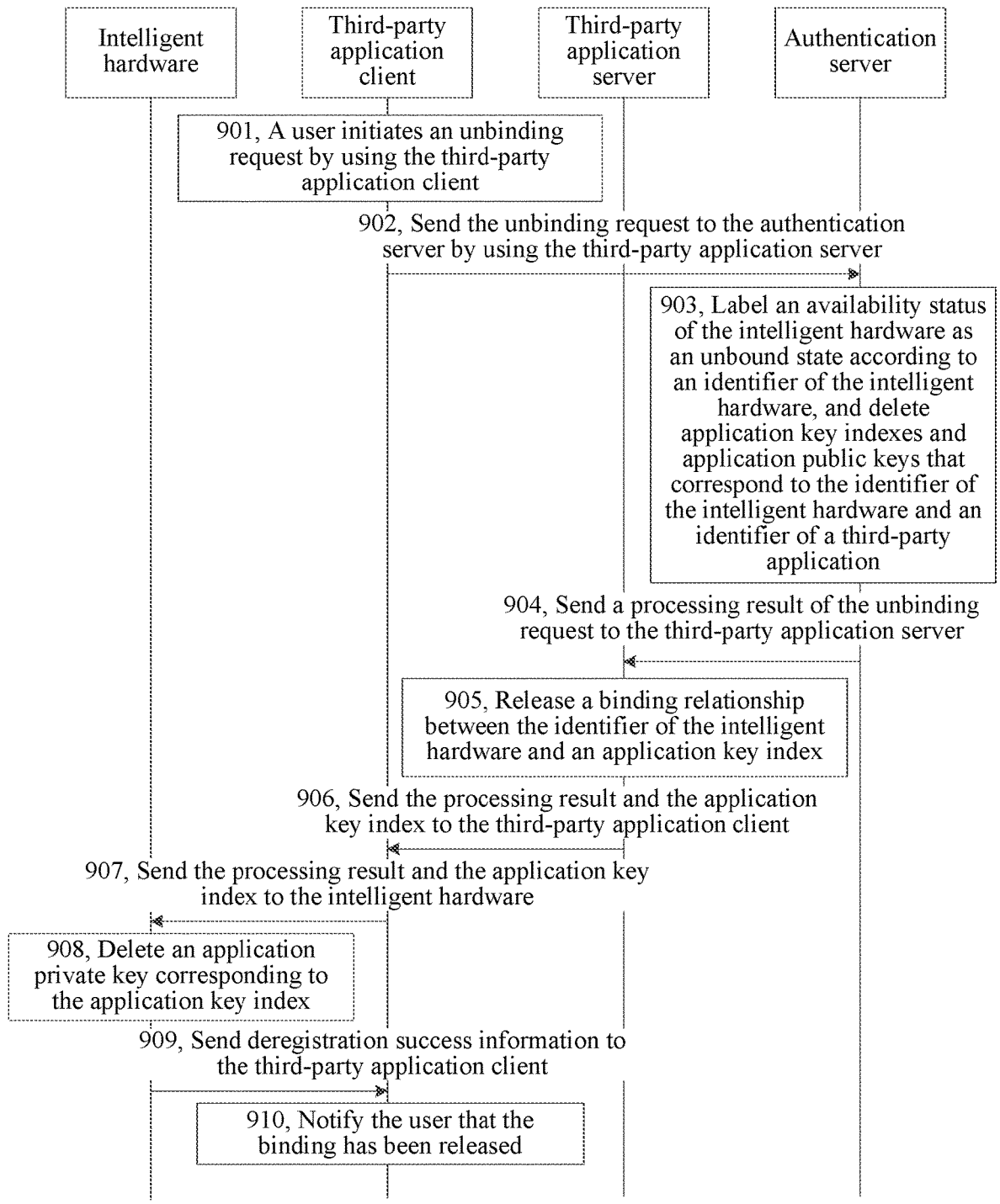
FIG. 9 is a flowchart of an unbinding method according to example embodiments.

FIG. 9 is a flowchart of an unbinding method according to example embodiments. The method may include several steps as follows:

Step 901: A user initiates an unbinding request by using a third-party application client.

At least two authentication manners (for example, email, and an SMS verification code on a mobile phone) are used to confirm that the unbinding request is initiated by an authentic user.

Step 902: The third-party application client sends the unbinding request to an authentication server by using a third-party application server.

The unbinding request at least includes unbinding request information and an identifier of intelligent hardware. The unbinding request information is used to request execution of an unbinding operation. Optionally, the unbinding request further includes a user account and an identifier of a third-party application.

Correspondingly, the authentication server receives the unbinding request sent by using the third-party application server by the third-party application client.

Step 903: The authentication server labels an availability status of the intelligent hardware as an unbound state according to an identifier of the intelligent hardware, and deletes application key indexes and application public keys that correspond to the identifier of the intelligent hardware and an identifier of a third-party application.

Step 904: The authentication server sends a processing result of the unbinding request to the third-party application server.

Correspondingly, the third-party application server receives the processing result sent by the authentication server.

Step 905: The third-party application server releases a binding relationship between the identifier of the intelligent hardware and an application key index.

Step 906: The third-party application server sends the processing result and the application key index to the third-party application client.

Correspondingly, the third-party application client receives the processing result and the application key index that are sent by the third-party application server.

Step 907: The third-party application client sends the processing result and the application key index to the intelligent hardware.

Correspondingly, the intelligent hardware receives the processing result and the application key index that are sent by the third-party application client.

Step 908: The intelligent hardware deletes an application private key corresponding to the application key index.

Step 909: The intelligent hardware sends deregistration success information to the third-party application client.

Correspondingly, the third-party application client receives the deregistration success information sent by the intelligent hardware.

Step 910: The third-party application client notifies the user that the binding has been released.

In the foregoing example embodiments shown in FIG. 9, the third-party application client initiates an unbinding procedure. In another possible embodiment, a management client may initiate an unbinding procedure.

Figure 10:
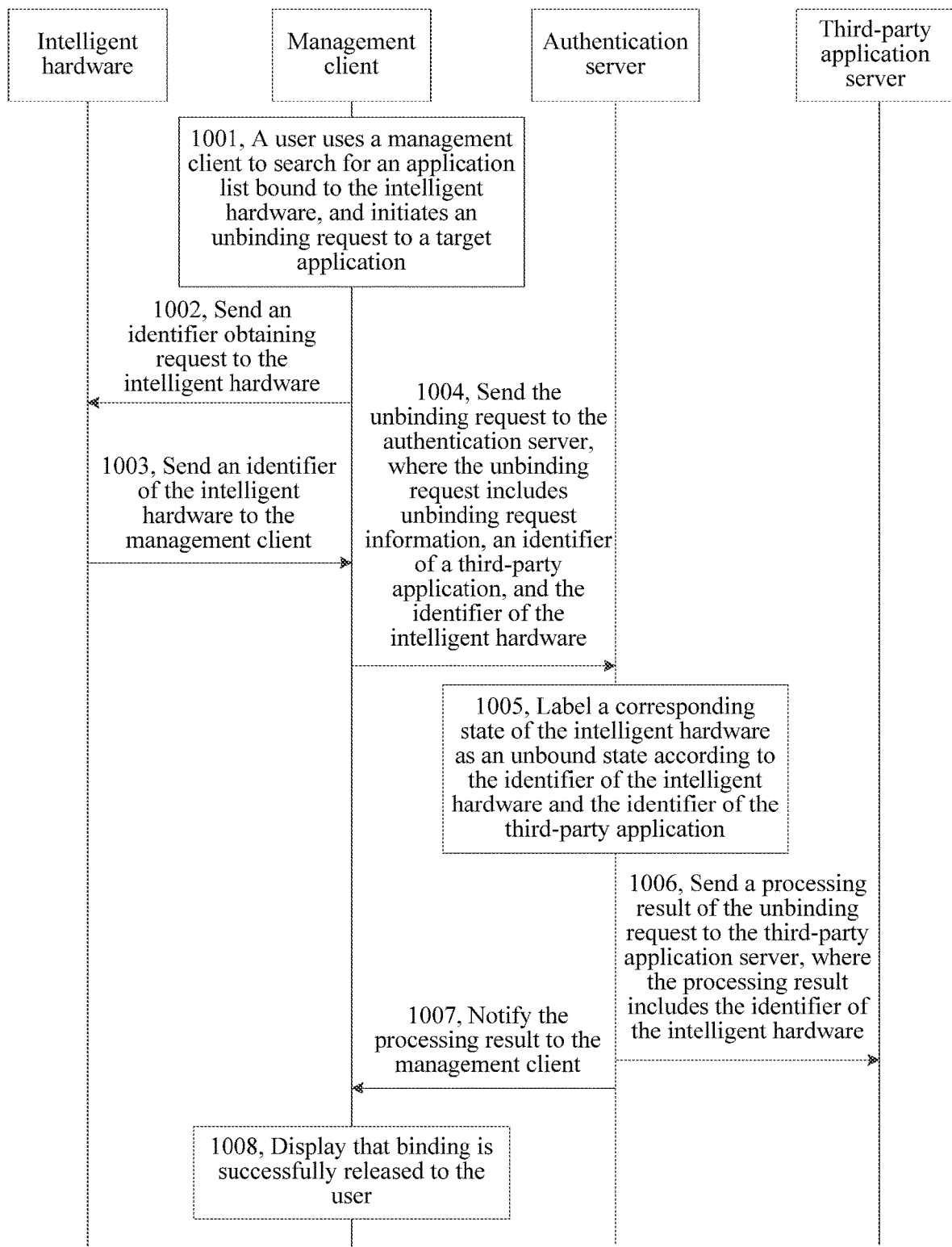
FIG. 10 is a flowchart of an unbinding method according to example embodiments.

FIG. 10 is a flowchart of an unbinding method according to example embodiments. The method may include several steps as follows:

Step 1001: A user uses the management client to search for an application list bound to intelligent hardware, and initiates an unbinding request to a target application.

Step 1002: The management client sends an identifier obtaining request to the intelligent hardware.

Correspondingly, the intelligent hardware receives the identifier obtaining request sent by the management client.

Step 1003: The intelligent hardware sends an identifier of the intelligent hardware to the management client.

Correspondingly, the management client receives the identifier of the intelligent hardware sent by the intelligent hardware.

Step 1004: The management client sends the unbinding request to an authentication server, where the unbinding request includes unbinding request information, an identifier of a third-party application, and the identifier of the intelligent hardware.

Correspondingly, the authentication server receives the unbinding request sent by the management client.

Step 1005: The authentication server labels a corresponding state of the intelligent hardware as an unbound state according to the identifier of the intelligent hardware and the identifier of the third-party application.

Step 1006: The authentication server sends a processing result of the unbinding request to a third-party application server, where the processing result includes the identifier of the intelligent hardware.

Correspondingly, the third-party application server receives the processing result sent by the authentication server.

Step 1007: The authentication server notifies the processing result to the management client.

Correspondingly, the management client receives the processing result sent by the authentication server.

Step 1008: The management client displays that binding is successfully released to the user.

Figure 11:
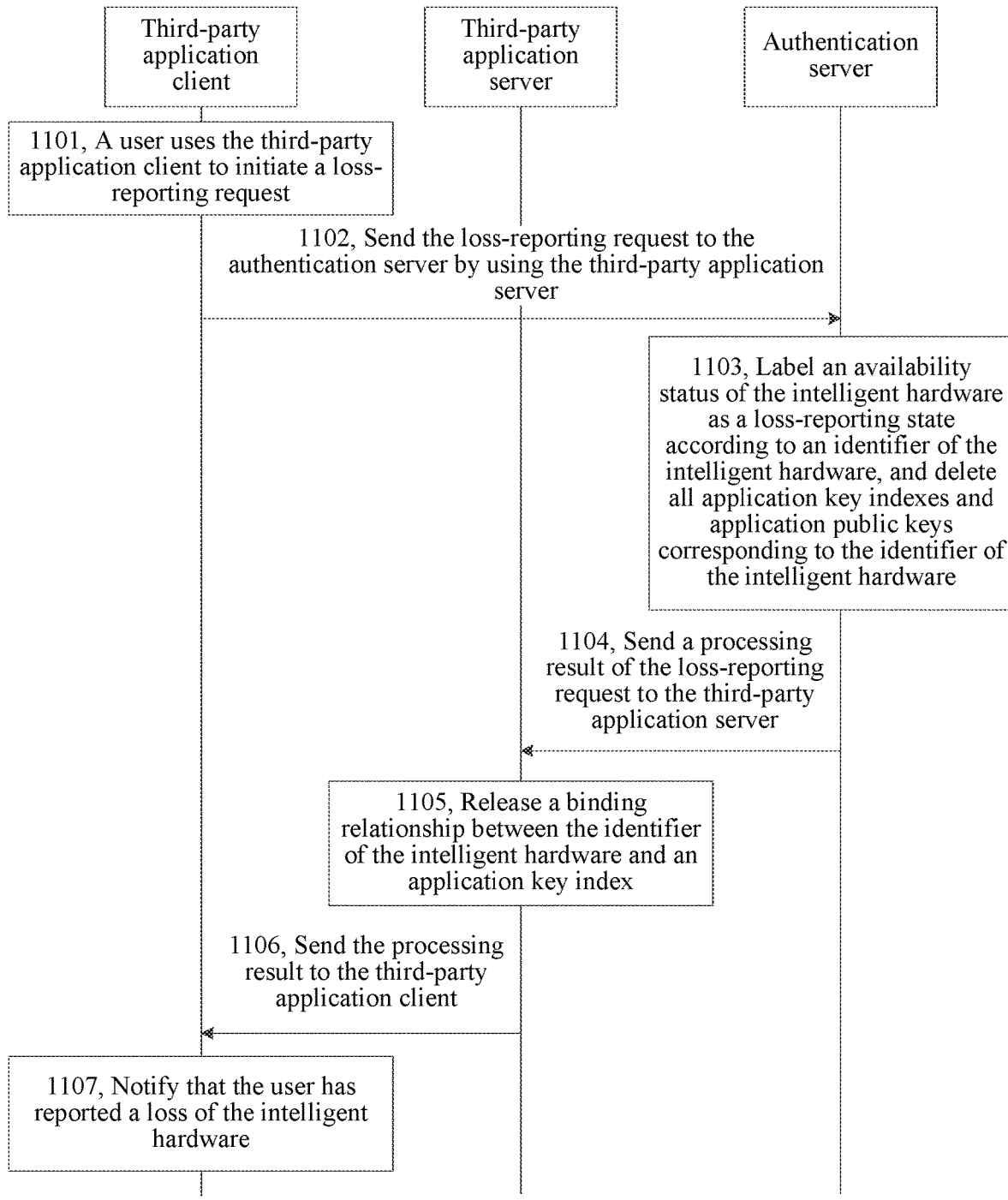
FIG. 11 is a flowchart of a loss-reporting method according to example embodiments.

FIG. 11 is a flowchart of a loss-reporting method according to example embodiments. The method may include several steps as follows:

Step 1101: A user uses a third-party application client to initiate a loss-reporting request.

At least two authentication manners are used to confirm that the loss-reporting request is initiated by an authentic user (for example, email, and an SMS verification code on a mobile phone).

Step 1102: The third-party application client sends the loss-reporting request to an authentication server by using a third-party application server.

The loss-reporting request at least includes loss-reporting request information and an identifier of intelligent hardware. The loss-reporting request information is used to request execution of a loss-reporting operation. Optionally, the loss-reporting request further includes a user account and an identifier of a third-party application.

Correspondingly, the authentication server receives the third-party application client by using the loss-reporting request sent by the third-party application server.

Step 1103: The authentication server labels an availability status of the intelligent hardware as a loss-reporting state according to an identifier of the intelligent hardware, and deletes all application key indexes and application public keys corresponding to the identifier of the intelligent hardware.

Step 1104: The authentication server sends a processing result of the loss-reporting request to the third-party application server.

Correspondingly, the third-party application server receives the processing result sent by the authentication server.

Step 1105: The third-party application server releases a binding relationship between the identifier of the intelligent hardware and an application key index.

Step 1106: The third-party application server sends the processing result to the third-party application client.

Correspondingly, the third-party application client receives the processing result sent by the third-party application server.

Step 1107: The third-party application client notifies that the user has reported a loss of the intelligent hardware.

In the foregoing example embodiments shown in FIG. 11, the third-party application client initiates a loss-reporting procedure. In example embodiments, a management client may initiate a loss-reporting procedure.

Figure 12:
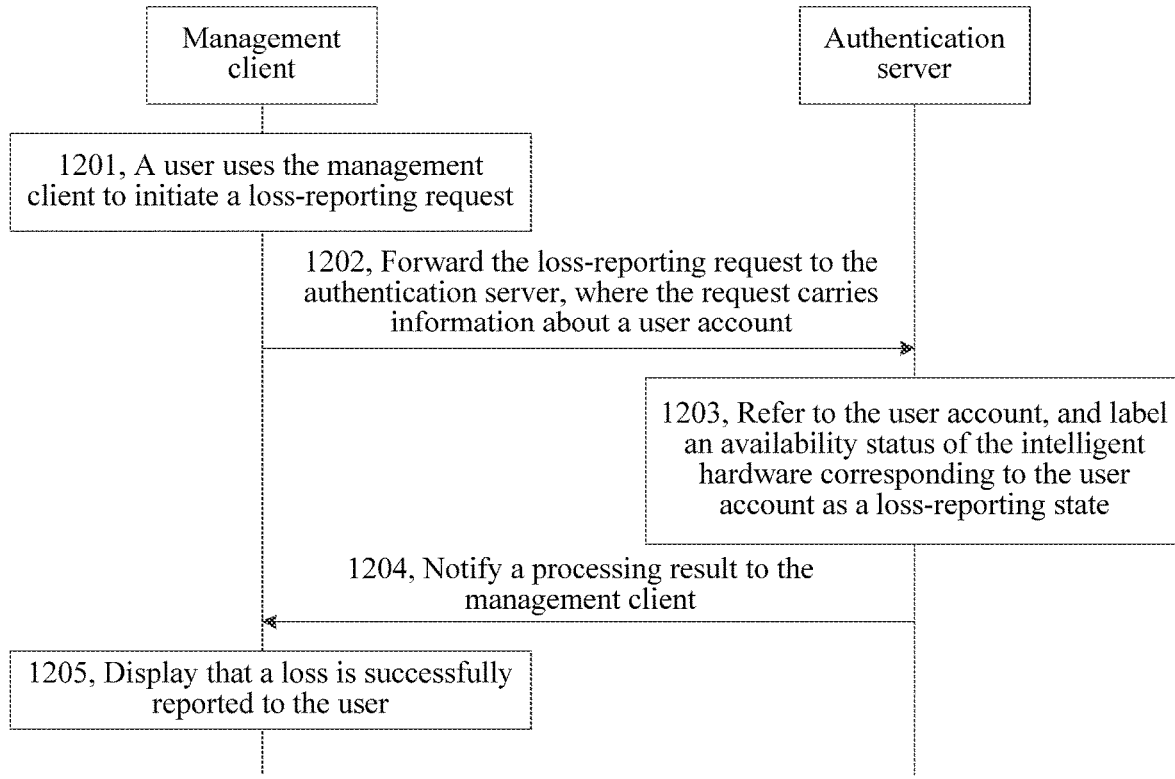
FIG. 12 is a flowchart of a loss-reporting method according to example embodiments.

FIG. 12 is a flowchart of a loss-reporting method according to example embodiments. The method may include several steps as follows:

Step 1201: A user uses the management client to initiate a loss-reporting request.

Step 1202: The management client forwards the loss-reporting request to an authentication server, where the request carries information about a user account.

Correspondingly, the authentication server receives the loss-reporting request sent by the management client.

Step 1203: The authentication server refers to the user account, and labels an availability status of intelligent hardware corresponding to the user account as a loss-reporting state.

Step 1204: The authentication server notifies a processing result to the management client.

Correspondingly, the management client receives the processing result sent by the authentication server.

Step 1205: The management client displays that a loss is successfully reported to the user.

In the technical solution provided in the foregoing example embodiments, a secure and convenient login or payment manner that requires no password, that is, uses intelligent hardware is provided to a user to access a third-party application. The user first uses an account and password manner to log in to a third-party application client that supports use of the intelligent hardware, binds the intelligent hardware on the third-party application client according to prompted steps, and can use the intelligent hardware to log in to the third-party application or make payment on the third-party application after binding is completed. The intelligent hardware may be used on a plurality of third-party applications. A password does not need to be input. The user can complete the operation by only performing a corresponding interaction action (for example, pressing a confirmation button, scanning a fingerprint, scanning an iris) to confirm that the user is performing the operation. Therefore, the operations are simplified, user experience is improved, and the security of login or payment is ensured. The user only needs to verify the identity on an application to rapidly unbind an intelligent application from the application and deregister information about the application on the intelligent hardware if the user does not want to use the intelligent hardware on the application. The user only needs to verify the identity on an application to rapidly report a loss of the intelligent hardware and deregister all information bound to the intelligent hardware if the user loses the intelligent hardware.

In the foregoing method example embodiments, the foregoing steps related to the third-party application client may be independently implemented to become an identity authentication method on the side of the third-party application client, the foregoing steps related to the third-party application server may be independently implemented to become an identity authentication method on the side of the third-party application server, the foregoing steps related to the intelligent hardware may be independently implemented to become an identity authentication method on the side of the intelligent hardware, and the foregoing steps related to the authentication server may be independently implemented to become an identity authentication method on the side of the authentication server.

System example embodiments are described below. For details that are not adequately described in the system example embodiments, refer to the foregoing corresponding method example embodiments.

Figure 13:
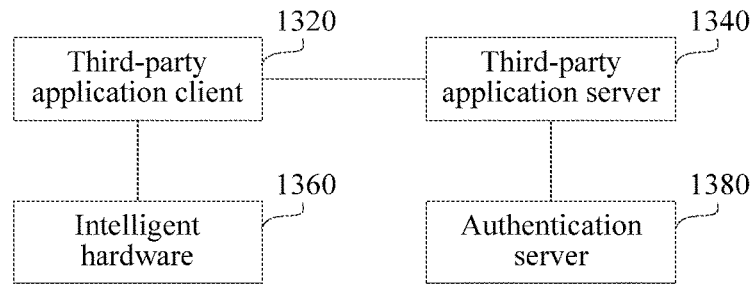
FIG. 13 is a block diagram of an identity authentication system according to example embodiments.

FIG. 13 is a block diagram of an identity authentication system according to example embodiments. The system includes a third-party application client 1320, a third-party application server 1340, intelligent hardware 1360, and an authentication server 1380.

The third-party application client 1320 is configured to send an operation request to the third-party application server 1340 after obtaining an operation indication for requesting to perform a target operation, where the operation request is used to request the third-party application server 1340 to perform the target operation.

The third-party application server 1340 is configured to request to obtain to-be-signed information from the authentication server 1380, and forward the to-be-signed information to the intelligent hardware 1360 by using the third-party application client 1320.

The intelligent hardware 1360 is configured to sign the to-be-signed information by using an application private key corresponding to a third-party application, to obtain a first signature result, and transparently transmit the first signature result to the authentication server 1380 by using the third-party application client 1320 and the third-party application server 1340 sequentially.

The authentication server 1380 is configured to verify whether the first signature result is correct by using an application public key corresponding to the third-party application, and send a verification success indication to the third-party application server 1340 if the first signature result is correct.

The third-party application server 1340 is further configured to perform the target operation after receiving the verification success indication.

To sum up, in the system provided in these example embodiments, intelligent hardware signs to-be-signed information to obtain a first signature result, and an authentication server instructs a third-party application server to perform a target operation when verifying that the first signature result is correct. The problem that operations are complex and inefficient when a user performs a network operation that requires identity authentication because the user needs to manually input related information for identity authentication in an existing identity authentication manner is resolved. The intelligent hardware is used to implement identity authentication, the user does not need to manually input related information for identity authentication, so that it is more convenient and efficient for the user to perform a network operation that requires identity authentication.

In example embodiments based on the example embodiments shown in FIG. 13, the intelligent hardware 1360 is configured to:

obtain a value of a counter, where the counter is used to count a quantity of times that the application private key corresponding to the third-party application is referenced;

sign the to-be-signed information and the value of the counter by using the application private key corresponding to the third-party application, to obtain the first signature result; and transparently transmit the first signature result and the value of the counter to the authentication server 1380 by using the third-party application client 1320 and the third-party application server 1340 sequentially.

In example embodiments based on the example embodiments shown in FIG. 13, the third-party application server 1340 is configured to obtain an identifier of the intelligent hardware 1360, and send an authentication request to the authentication server 1380, where the authentication request at least includes authentication request information and the identifier of the intelligent hardware, and the authentication request information is used to request the authentication server 1380 to generate the to-be-signed information. The authentication server 1380 is configured to obtain an availability status of the intelligent hardware 1360 according to the identifier of the intelligent hardware 1360, generate the to-be-signed information if the availability status of the intelligent hardware 1360 indicates that the intelligent hardware 1360 is available, and send the to-be-signed information to the third-party application server 1340.

In example embodiments based on the example embodiments shown in FIG. 13, the intelligent hardware 1360 is further configured to generate confirmation prompt information, where the confirmation prompt information is used to query whether to confirm execution of the target operation. The intelligent hardware 1360 is further configured to perform the step of signing the to-be-signed information by using an application private key corresponding to a third-party application, to obtain a first signature result after obtaining a confirmation indication corresponding to the confirmation prompt information.

In example embodiments based on the example embodiments shown in FIG. 13, the target operation is a login operation or a payment operation.

In example embodiments based on the example embodiments shown in FIG. 13, the third-party application client 1320 is further configured to obtain the identifier of the intelligent hardware 1360 after obtaining an operation indication for requesting binding of the intelligent hardware 1360, and send a binding request to the third-party application server 1340, where the binding request includes binding request information and the identifier of the intelligent hardware 1360, and the binding request information is used to request establishment of a binding relationship between the intelligent hardware 1360 and a user account that is used to log in to the third-party application client 1320. The third-party application server 1340 is further configured to forward the binding request to the authentication server 1380, where the binding request at least includes the binding request information and the identifier of the intelligent hardware 1360. The authentication server 1380 is further configured to transparently transmit a registration request to the intelligent hardware 1360 by using the third-party application server 1340 and the third-party application client 1320 sequentially after receiving the binding request. The intelligent hardware 1360 is further configured to generate the application public key corresponding to the third-party application and the application private key after receiving the registration request, sign the application public key corresponding to the third-party application by using a hardware private key corresponding to the intelligent hardware 1360, to obtain a second signature result, transparently transmit to-be-verified information to the authentication server 1380 by using the third-party application client 1320 and the third-party application server 1340 sequentially, where the to-be-verified information includes the application public key corresponding to the third-party application, the second signature result, and a hardware certificate of the intelligent hardware 1360, and the hardware certificate of the intelligent hardware 1360 includes a hardware public key corresponding to the intelligent hardware 1360 and the identifier of the intelligent hardware 1360.

In the foregoing example embodiments, the authentication server 1380 is further configured to retrieve the hardware public key corresponding to the intelligent hardware 1360 from the hardware certificate of the intelligent hardware 1360 if verifying that the hardware certificate of the intelligent hardware 1360 is authorized by using a root certificate public key, verify whether the second signature result is correct by using the hardware public key corresponding to the intelligent hardware 1360, store a first binding relationship if the second signature result is correct, where the first binding relationship includes a binding relationship among the identifier of the intelligent hardware 1360, the user account, and the application public key corresponding to the third-party application, and send the identifier of the intelligent hardware 1360 to the third-party application server 1340. The third-party application server 1340 is further configured to store a second binding relationship, where the second binding relationship includes a binding relationship between the identifier of the intelligent hardware 1360 and the user account.

In example embodiments based on the example embodiments shown in FIG. 13, the intelligent hardware 1360 is further configured to generate an application key index, where the application key index is used to index the application public key corresponding to the third-party application and the application private key. The intelligent hardware 1360 is further configured to send the application key index to the authentication server 1380 by using the third-party application client 1320 and the third-party application server 1340 sequentially, where the first binding relationship includes a binding relationship among the identifier of the intelligent hardware 1360, the user account, the application key index, and the application public key corresponding to the third-party application, and the second binding relationship includes a binding relationship among the identifier of the intelligent hardware 1360, the user account, and the application key index.

In example embodiments based on the example embodiments shown in FIG. 13, the intelligent hardware 1360 is configured to:

generate a digest value of an application parameter and the application private key corresponding to the third-party application;

generate a random number; and generate the application key index according to the digest value and the random number.

In example embodiments based on the example embodiments shown in FIG. 13, the third-party application server 1340 is further configured to search the second binding relationship to obtain the corresponding application key index according to the identifier of the intelligent hardware 1360 or the user account, and forward the application key index to the intelligent hardware 1360 by using the third-party application client 1320. The intelligent hardware 1360 is further configured to obtain the application private key corresponding to the third-party application according to the application key index.

In example embodiments based on the example embodiments shown in FIG. 13, the third-party application client 1320 is further configured to send a deregistration operation request to the third-party application server 1340 after obtaining an operation indication for requesting to perform a deregistration operation, where the deregistration operation request at least includes deregistration request information and the identifier of the intelligent hardware 1360, the deregistration request information is used to request execution of the deregistration operation, the deregistration operation is an unbinding operation or a loss-reporting operation, the unbinding operation is to release the binding relationship between the intelligent hardware 1360 and the user account, and the loss-reporting operation is to report a loss of the intelligent hardware 1360. The third-party application server 1340 is further configured to transparently transmit the deregistration operation request to the authentication server 1380, and the authentication server 1380 is further configured to perform the deregistration operation after receiving the deregistration operation request.

Figure 14:
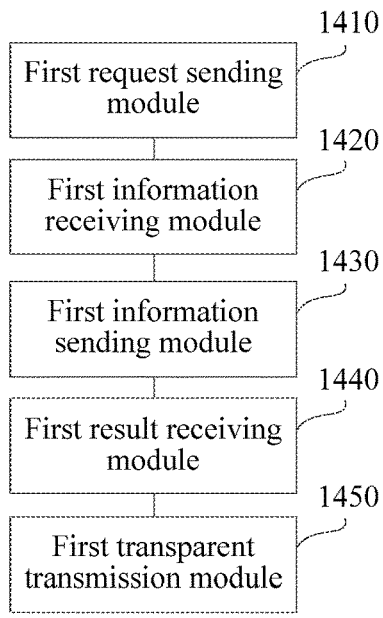
FIG. 14 is a block diagram of a third-party application client according to example embodiments.

FIG. 14 is a block diagram of a third-party application client according to example embodiments. The third-party application client includes a first request sending module 1410, a first information receiving module 1420, a first information sending module 1430, a first result receiving module 1440, and a first transparent transmission module 1450.

The first request sending module 1410 is configured to send an operation request to a third-party application server after an operation indication for requesting to perform a target operation is obtained, the operation request being used to request the third-party application server to perform the target operation.

The first information receiving module 1420 is configured to receive to-be-signed information sent by the third-party application server, the third-party application server requesting to obtain the to-be-signed information from an authentication server after receiving the operation request.

The first information sending module 1430 is configured to forward the to-be-signed information to intelligent hardware.

The first result receiving module 1440 is configured to receive a first signature result sent by the intelligent hardware, the intelligent hardware obtaining the first signature result after signing the to-be-signed information by using an application private key corresponding to a third-party application.

The first transparent transmission module 1450 is configured to transparently transmit the first signature result to the authentication server by using the third-party application server, so that the authentication server verifies whether the first signature result is correct by using an application public key corresponding to the third-party application, and sends a verification success indication to the third-party application server to trigger the third-party application server to perform the target operation when the first signature result is correct.

In example embodiments based on the example embodiments shown in FIG. 14, the target operation is a login operation or a payment operation.

In example embodiments based on the example embodiments shown in FIG. 14, the third-party application client further includes:

an identifier obtaining module configured to obtain the identifier of the intelligent hardware after obtaining the operation indication for requesting binding of the intelligent hardware;

a second request sending module configured to send a binding request to the third-party application server, where the binding request includes binding request information and the identifier of the intelligent hardware, and the binding request information is used to request establishment of a binding relationship between the intelligent hardware and a user account that is used to log in to the third-party application client;

a first request receiving module configured to receive a registration request sent by the third-party application server, where the authentication server generates the registration request after receiving the binding request forwarded by the third-party application server and sends the registration request to the third-party application server;

a third request sending module configured to transparently transmit the registration request to the intelligent hardware, so that the intelligent hardware generates the application public key corresponding to the third-party application and the application private key after receiving the registration request, and signs the application public key corresponding to the third-party application by using the hardware private key corresponding to the intelligent hardware, to obtain a second signature result;

a second information receiving module configured to receive to-be-verified information sent by the intelligent hardware, where the to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware; and a second transparent transmission module configured to transparently transmit the to-be-verified information to the authentication server by using the third-party application server, so that the authentication server retrieves the hardware public key corresponding to the intelligent hardware from the hardware certificate of the intelligent hardware if verifying that the hardware certificate of the intelligent hardware is authorized by using a root certificate public key, stores a first binding relationship if verifying that the second signature result is correct by using the hardware public key corresponding to the intelligent hardware, where the first binding relationship includes a binding relationship among the identifier of the intelligent hardware, the user account, and the application public key corresponding to the third-party application, and sends the identifier of the intelligent hardware to the third-party application server, and the third-party application server is configured to store a second binding relationship, where the second binding relationship includes a binding relationship between the identifier of the intelligent hardware and the user account.

In example embodiments based on the example embodiments shown in FIG. 14, the third-party application client further includes:

a fourth request sending module configured to transparently transmit a specified-operation request to the authentication server by using the third-party application server after obtaining the operation indication for requesting to perform the specified operation, where the specified-operation request at least includes operation request information and the identifier of the intelligent hardware, the operation request information is used to request execution of the specified operation, the specified operation is an unbinding operation or a loss-reporting operation, the unbinding operation is to release the binding relationship between the intelligent hardware and the user account, the loss-reporting operation is to report a loss of the intelligent hardware, and the authentication server is configured to perform the specified operation after receiving the specified-operation request.

Figure 15:
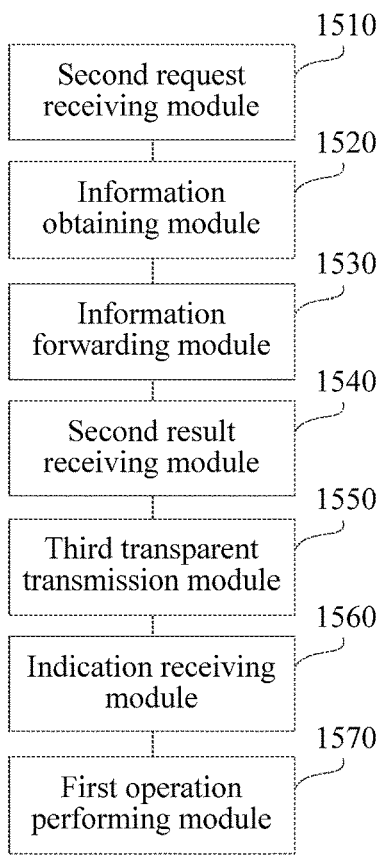
FIG. 15 is a block diagram of a third-party application server according to example embodiments.

FIG. 15 is a block diagram of a third-party application server according to example embodiments. The third-party application server includes a second request receiving module 1510, an information obtaining module 1520, an information forwarding module 1530, a second result receiving module 1540, a third transparent transmission module 1550, an indication receiving module 1560, and a first operation performing module 1570.

The second request receiving module 1510 is configured to receive an operation request sent by a third-party application client, the third-party application client sending the operation request to the third-party application server after obtaining an operation indication for requesting to perform a target operation, and the operation request being used to request the third-party application server to perform the target operation.

The information obtaining module 1520 is configured to request to obtain to-be-signed information from an authentication server.

The information forwarding module 1530 is configured to forward the to-be-signed information to intelligent hardware by using the third-party application client.

The second result receiving module 1540 is configured to receive a first signature result sent by the third-party application client, the intelligent hardware obtaining the first signature result after signing the to-be-signed information by using an application private key corresponding to a third-party application and being sent by the intelligent hardware to the third-party application client.

The third transparent transmission module 1550 is configured to transparently transmit the first signature result to the authentication server.

The indication receiving module 1560 is configured to receive a verification success indication sent by the authentication server, the authentication server sending the verification success indication when verifying that the first signature result is correct by using an application public key corresponding to the third-party application.

The first operation performing module 1570 is configured to perform the target operation after receiving the verification success indication.

In example embodiments based on the example embodiments shown in FIG. 15, the information obtaining module includes:

an identifier obtaining submodule configured to obtain an identifier of the intelligent hardware;

a request sending submodule configured to send an authentication request to the authentication server, where the authentication request at least includes authentication request information and the identifier of the intelligent hardware, and the authentication request information is used to request the authentication server to generate the to-be-signed information; and an information receiving submodule configured to receive the to-be-signed information sent by the authentication server, where the authentication server generates the to-be-signed information if obtaining an availability status of the intelligent hardware according to the identifier of the intelligent hardware and the availability status of the intelligent hardware indicates that the intelligent hardware is available.

In example embodiments based on the example embodiments shown in FIG. 15, the target operation is a login operation or a payment operation.

In example embodiments based on the example embodiments shown in FIG. 15, the third-party application server further includes:

a third request receiving module configured to receive a binding request sent by the third-party application client, where the third-party application client sends the binding request after obtaining an operation indication for requesting binding of the intelligent hardware, the binding request includes binding request information and the identifier of the intelligent hardware, and the binding request information is used to request establishment of a binding relationship between the intelligent hardware and a user account that is used to log in to the third-party application client;

a fifth request sending module configured to forward the binding request to the authentication server, where the binding request at least includes the binding request information and the identifier of the intelligent hardware;

a fourth request receiving module configured to receive a registration request sent by the authentication server, where the authentication server generates and sends the registration request after receiving the binding request;

the third transparent transmission module configured to transparently transmit the registration request to the intelligent hardware by using the third-party application client, so that the intelligent hardware generates the application public key corresponding to the third-party application and the application private key after receiving the registration request, and signs the application public key corresponding to the third-party application by using the hardware private key corresponding to the intelligent hardware, to obtain a second signature result;

a third information receiving module configured to receive to-be-verified information sent by the third-party application client, where the intelligent hardware sends the to-be-verified information to the third-party application client, the to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware;

a second information sending module configured to transparently transmit the to-be-verified information to the authentication server, so that the authentication server retrieves the hardware public key corresponding to the intelligent hardware from the hardware certificate of the intelligent hardware if verifying that the hardware certificate of the intelligent hardware is authorized by using a root certificate public key, stores a first binding relationship if verifying that the second signature result is correct by using the hardware public key corresponding to the intelligent hardware, where the first binding relationship includes a binding relationship among the identifier of the intelligent hardware, the user account, and the application public key corresponding to the third-party application, and sends the identifier of the intelligent hardware to the third-party application server;

an identifier receiving module configured to receive the identifier of the intelligent hardware sent by the authentication server; and a relationship storage module configured to store a second binding relationship, where the second binding relationship includes a binding relationship between the identifier of the intelligent hardware and the user account.

In example embodiments based on the example embodiments shown in FIG. 15, the third-party application server further includes:

a fifth request receiving module configured to receive a specified-operation request sent by the third-party application client, where the third-party application client sends the specified-operation request after obtaining the operation indication for requesting to perform the specified operation, the specified-operation request at least includes operation request information and the identifier of the intelligent hardware, the operation request information is used to request execution of the specified operation, the specified operation is an unbinding operation or a loss-reporting operation, the unbinding operation is to release the binding relationship between the intelligent hardware and the user account, and the loss-reporting operation is to report a loss of the intelligent hardware; and a fourth transparent transmission module configured to transparently transmit the specified-operation request to the authentication server, so that the authentication server performs the specified operation after receiving the specified-operation request.

Figure 16:
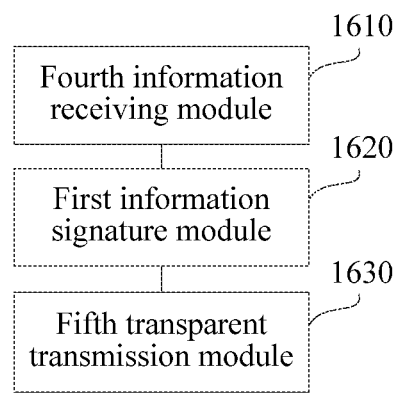
FIG. 16 is a block diagram of intelligent hardware according to example embodiments.

FIG. 16 is a block diagram of intelligent hardware according to example embodiments. The intelligent hardware includes a fourth information receiving module 1610, a first information signature module 1620, and a fifth transparent transmission module 1630.

The fourth information receiving module 1610 is configured to receive to-be-signed information sent by a third-party application client, a third-party application server obtaining the to-be-signed information from an authentication server after receiving an operation request sent by the third-party application client, the third-party application client sending the operation request to the third-party application server after obtaining an operation indication for requesting to perform a target operation, and the operation request being used to request the third-party application server to perform the target operation.

The first information signature module 1620 is configured to sign the to-be-signed information by using an application private key corresponding to a third-party application, to obtain a first signature result.

The fifth transparent transmission module 1630 is configured to transparently transmit the first signature result to the authentication server by using the third-party application client and the third-party application server sequentially, so that the authentication server verifies whether the first signature result is correct by using an application public key corresponding to the third-party application, and sends a verification success indication to the third-party application server to trigger the third-party application server to perform the target operation when the first signature result is correct.

In example embodiments based on the example embodiments shown in FIG. 16, the first information signature module includes:

a value obtaining submodule configured to obtain a value of a counter, where the counter is used to count a quantity of signature operations, that is, the counter is used to count a quantity of times that the application private key corresponding to the third-party application is referenced; and a value signature submodule configured to sign the to-be-signed information and the value of the counter by using the application private key corresponding to the third-party application, to obtain the first signature result, where the fifth transparent transmission module is further configured to transparently transmit the first signature result and the value of the counter to the authentication server by using the third-party application client and the third-party application server sequentially.

In example embodiments based on the example embodiments shown in FIG. 16, the intelligent hardware further includes:

a prompt generation module configured to generate confirmation prompt information, where the confirmation prompt information is used to query whether to confirm execution of the target operation, where the first information signature module is further configured to perform the step of signing the to-be-signed information by using an application private key corresponding to a third-party application, to obtain a first signature result after obtaining a confirmation indication corresponding to the confirmation prompt information.

In example embodiments based on the example embodiments shown in FIG. 16, the target operation is a login operation or a payment operation.

In example embodiments based on the example embodiments shown in FIG. 16, the intelligent hardware further includes:

a sixth request receiving module configured to receive a registration request sent by the third-party application client, where the authentication server generates the registration request after receiving a binding request forwarded by the third-party application server and transparently transmits the registration request to the third-party application client by using the third-party application server, the third-party application client sends the binding request to the third-party application server after obtaining an operation indication for requesting binding of the intelligent hardware, the binding request includes binding request information and an identifier of the intelligent hardware, and the binding request information is used to request establishment of a binding relationship between the intelligent hardware and a user account that is used to log in to the third-party application client;

a key generation module configured to generate the application public key corresponding to the third-party application and the application private key after receiving the registration request;

a second information signature module configured to sign the application public key corresponding to the third-party application by using the hardware private key corresponding to the intelligent hardware, to obtain a second signature result;

a sixth transparent transmission module configured to transparently transmit to-be-verified information to the authentication server by using the third-party application client and the third-party application server sequentially, where the to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware, so that the authentication server retrieves the hardware public key corresponding to the intelligent hardware from the hardware certificate of the intelligent hardware if verifying that the hardware certificate of the intelligent hardware is authorized by using a root certificate public key, stores a first binding relationship if verifying that the second signature result is correct by using the hardware public key corresponding to the intelligent hardware, where the first binding relationship includes a binding relationship among the identifier of the intelligent hardware, the user account, and the application public key corresponding to the third-party application, and sends the identifier of the intelligent hardware to the third-party application server, and the third-party application server is configured to store a second binding relationship, where the second binding relationship includes a binding relationship between the identifier of the intelligent hardware and the user account.

In example embodiments based on the example embodiments shown in FIG. 16, the intelligent hardware further includes:

an index generation module configured to generate an application key index, where the application key index is used to index the application public key corresponding to the third-party application and the application private key; and an index sending module configured to send the application key index to the authentication server by using the third-party application client and the third-party application server sequentially, where the first binding relationship includes a binding relationship among the identifier of the intelligent hardware, the user account, the application key index, and the application public key corresponding to the third-party application, and the second binding relationship includes a binding relationship among the identifier of the intelligent hardware, the user account, and the application key index.

In example embodiments based on the example embodiments shown in FIG. 16, the index generation module includes:

a digest generation submodule configured to generate a digest value of an application parameter and the application private key corresponding to the third-party application;

a random number generation submodule configured to generate a random number; and an index generation submodule configured to generate the application key index according to the digest value and the random number.

Figure 17:
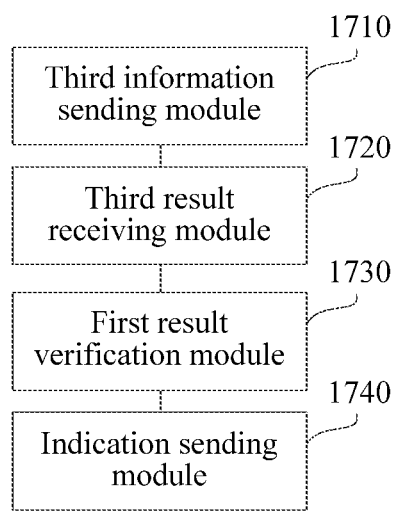
FIG. 17 is a block diagram of an authentication server according to example embodiments.

FIG. 17 is a block diagram according of an authentication server to example embodiments. The authentication server includes a third information sending module 1710, a third result receiving module 1720, a first result verification module 1730, and an indication sending module 1740.

The third information sending module 1710 is configured to send to-be-signed information to a third-party application server after an authentication request sent by the third-party application server is received, the third-party application server sending the authentication request to the authentication server after receiving an operation request sent by a third-party application client, the third-party application client sending the operation request to the third-party application server after obtaining an operation indication for requesting to perform a target operation, and the operation request being used to request the third-party application server to perform the target operation.

The third result receiving module 1720 is configured to receive a first signature result transparently transmitted by intelligent hardware by using the third-party application client and the third-party application server sequentially, the intelligent hardware obtaining the first signature result by signing the to-be-signed information by using an application private key corresponding to a third-party application after receiving the to-be-signed information sent by the third-party application server.

The first result verification module 1730 is configured to verify whether the first signature result is correct by using an application public key corresponding to the third-party application.

The indication sending module 1740 is configured to send a verification success indication to the third-party application server when the first signature result is correct, to trigger the third-party application server to perform the target operation.

In example embodiments based on the example embodiments shown in FIG. 17, the third information sending module includes:

an identifier reading submodule configured to read authentication request information and an identifier of the intelligent hardware that are included in the authentication request after receiving the authentication request sent by the third-party application server, where the authentication request information is used to request the authentication server to generate the to-be-signed information;

a state obtaining submodule configured to obtain an availability status of the intelligent hardware according to the identifier of the intelligent hardware;

an information generation submodule configured to generate the to-be-signed information if the availability status of the intelligent hardware indicates that the intelligent hardware is available; and an information sending submodule configured to send the to-be-signed information to the third-party application server.

In example embodiments based on the example embodiments shown in FIG. 17, the target operation is a login operation or a payment operation.

In example embodiments based on the example embodiments shown in FIG. 17, the authentication server further includes:

a seventh request receiving module configured to receive a binding request forwarded by the third-party application server, where the binding request at least includes binding request information and the identifier of the intelligent hardware, the binding request information is used to request establishment of a binding relationship between the intelligent hardware and the user account that is used to log in to the third-party application client, and the third-party application client generates the binding request after obtaining an operation indication for requesting binding of the intelligent hardware and sends the binding request to the third-party application server;

a seventh transparent transmission module configured to transparently transmit a registration request to the intelligent hardware by using the third-party application server and the third-party application client sequentially after the binding request is received, so that the intelligent hardware generates the application public key corresponding to the third-party application and the application private key after receiving the registration request, and signs the application public key corresponding to the third-party application by using the hardware private key corresponding to the intelligent hardware, to obtain a second signature result;

a fourth information receiving module configured to receive to-be-verified information transparently transmitted by using the third-party application client and the third-party application server sequentially by the intelligent hardware, where the to-be-verified information includes the application public key corresponding to the third-party application, the second signature result, and a hardware certificate of the intelligent hardware, and the hardware certificate of the intelligent hardware includes a hardware public key corresponding to the intelligent hardware and the identifier of the intelligent hardware;

a public key retrieval module configured to retrieve the hardware public key corresponding to the intelligent hardware from the hardware certificate of the intelligent hardware if it is verified that the hardware certificate of the intelligent hardware is authorized by using a root certificate public key;

a second result verification module configured to verify whether the second signature result is correct by using the hardware public key corresponding to the intelligent hardware;

a relationship storage module configured to store a first binding relationship if the second signature result is correct, where the first binding relationship includes a binding relationship among the identifier of the intelligent hardware, the user account, and the application public key corresponding to the third-party application; and an identifier sending module configured to send the identifier of the intelligent hardware to the third-party application server, so that the third-party application server stores a second binding relationship, where the second binding relationship includes a binding relationship between the identifier of the intelligent hardware and the user account.

In example embodiments based on the example embodiments shown in FIG. 17, the authentication server further includes:

an index receiving module configured to receive an application key index sent by using the third-party application client and the third-party application server sequentially by the intelligent hardware, where the application key index is used to index the application public key corresponding to the third-party application and the application private key, where the first binding relationship includes a binding relationship among the identifier of the intelligent hardware, the user account, the application key index, and the application public key corresponding to the third-party application, and the second binding relationship includes a binding relationship among the identifier of the intelligent hardware, the user account, and the application key index.

In example embodiments based on the example embodiments shown in FIG. 17, the authentication server further includes:

an eighth request receiving module configured to receive a specified-operation request transparently transmitted by the third-party application server, where the third-party application client sends the specified-operation request to the third-party application server after obtaining the operation indication for requesting to perform the specified operation, the specified-operation request at least includes operation request information and the identifier of the intelligent hardware, the operation request information is used to request execution of the specified operation, the specified operation is an unbinding operation or a loss-reporting operation, the unbinding operation is to release the binding relationship between the intelligent hardware and the user account, and the loss-reporting operation is to report a loss of the intelligent hardware; and a second operation performing module configured to perform the specified operation after receiving the specified-operation request.

When the device according to the foregoing example embodiments implements its functions, division of the respective functional modules is only used as an example for description. In an actual application, the foregoing functions may be implemented by different functional modules by means of allocation according to requirements, that is, an internal structure of the device is divided into different functional modules to implement all or some of the foregoing functions. In addition, the system according to the foregoing example embodiments and the method example embodiments belong to the same concept. For the implementation process, refer to the method example embodiments, and the details are not described herein again.

Figure 18:
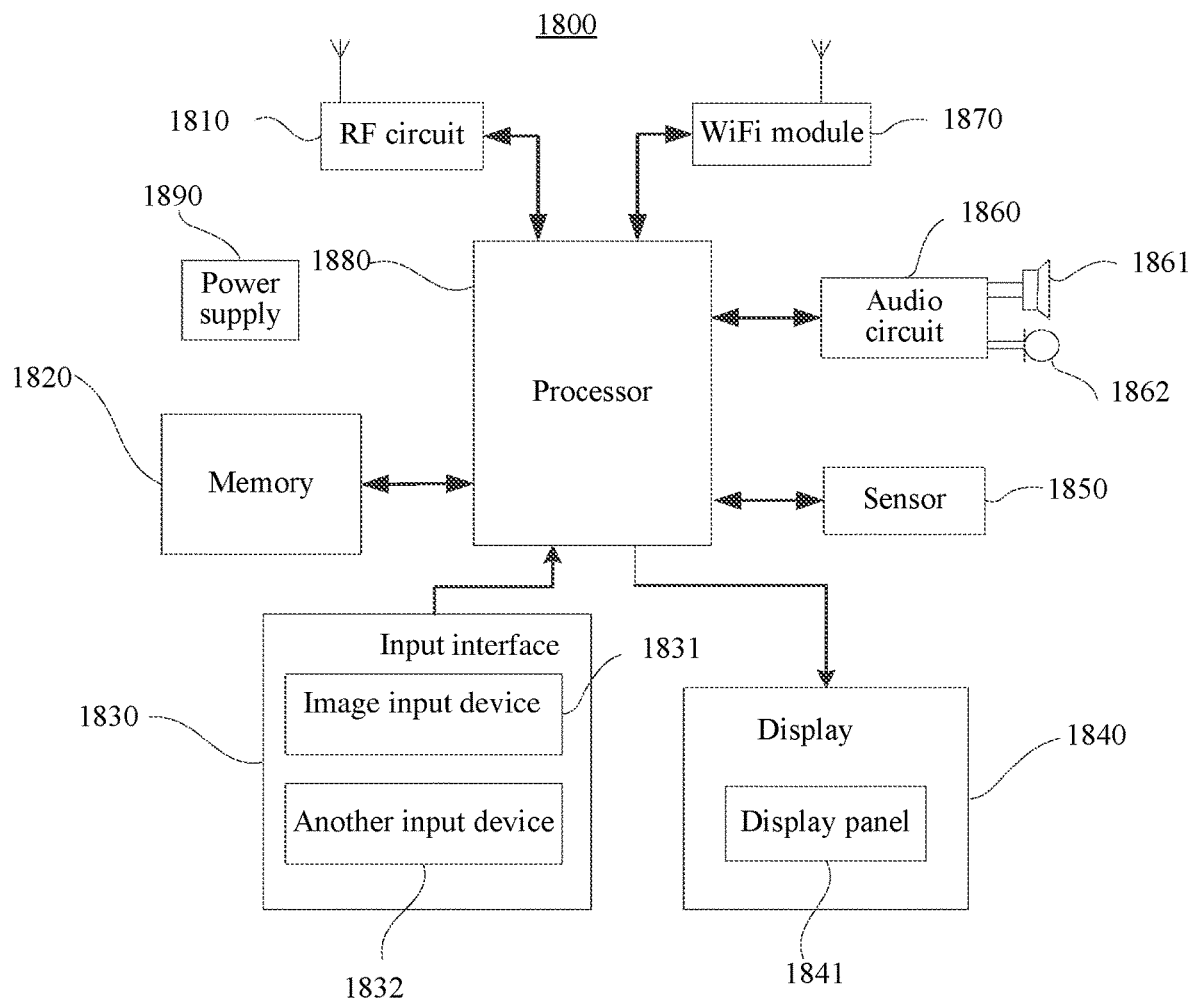
FIG. 18 is a schematic structural diagram of an electronic device according to example embodiments.

FIG. 18 is a schematic structural diagram of an electronic device according to example embodiments. The electronic device may be the intelligent hardware or the terminal on which a third-party application client is installed in the foregoing example embodiments.

An electronic device 1800 may include components such as a radio frequency (RF) circuit 1810, a memory 1820 including one or more computer readable storage media, an input interface 1830, a display 1840, a sensor 1850, an audio circuit 1860, a Wireless Fidelity (WiFi) interface 1870, a processor 1880 including one or more processing cores, and a power supply 1890. A person skilled in the art may understand that the structure of the electronic device shown in FIG. 18 does not constitute a limitation to the electronic device, and the electronic device may include more or fewer components than those shown in the figure, or some components may be combined, or a different component deployment may be used.

The RF circuit 1810 may be configured to receive and send signals during information receiving and sending or during a call. The RF circuit 1810 receives downlink information from a base station, then delivers the downlink information to one or more processors 1880 for processing, and sends related uplink data to the base station. The RF circuit 1810 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1810 may also communicate with a network and another device by wireless communication. The wireless communication may use any communication standard or protocol, including but not limited to {\kerning0 Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1820 may be configured to store a software program and module. The processor 1880 runs the software program and module stored in the memory 1820, to implement various functional applications and data processing. The memory 1820 may mainly include a program storage area and a data storage area. The program storage area may store an operating system, an application program required by at least one function (such as a sound playback function and an image display function), and the like. The data storage area may store data (such as audio data and an address book) created according to use of the electronic device 1800, and the like. In addition, the memory 1820 may include a high speed random-access memory, and may further include a non-volatile memory, such as at least one magnetic disk storage device, a flash memory, or other volatile solid-state storage devices. Correspondingly, the memory 1820 may further include a memory controller, to provide access of the processor 1880 and the input interface 1830 to the memory 1820.

The input interface 1830 may be configured to receive input digit or character information, and generate keyboard, mouse, joystick, optical, or track ball signal input related to the user setting and function control. The input interface 1830 may include an image input device 1831 and another input device 1832. The image input device 1831 may be a camera, or may be an optoelectronic scanning device. In addition to the image input device 1831, the input interface 1830 may further include the another input device 1832. The another input device 1832 may include, but is not limited to, one or more of a physical keyboard, a functional key (such as a volume control key or a switch key), a track ball, a mouse, and a joystick.

The display 1840 may be configured to display information input by a user or information provided for the user, and various graphical user interfaces of the electronic device 1800. The graphical user interfaces may be formed by a graph, a text, an icon, a video, and any combination thereof. The display 1840 may include a display panel 1841. Optionally, the display panel 1841 may be configured by using a liquid crystal display (LCD), an organic light-emitting diode (OLED), or the like.

The electronic device 1800 may further include at least one sensor 1850, such as an optical sensor, a motion sensor, and other sensors. The optical sensor may include an ambient light sensor and a proximity sensor. The ambient light sensor may adjust luminance of the display panel 1841 according to brightness of the ambient light. The proximity sensor may switch off the display panel 1841 and/or backlight when the electronic device 1800 is moved to the ear. As one type of motion sensor, a gravity acceleration sensor can detect values of accelerations in various directions (e.g., on three axes), may detect a value and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the electronic device 1800, are not further described herein.

The audio circuit 1860, a loudspeaker 1861, and a microphone 1862 may provide audio interfaces between the user and the electronic device 1800. The audio circuit 1860 may convert received audio data into an electric signal and transmit the electric signal to the speaker 1861. The speaker 1861 converts the electric signal into a sound signal for output. On the other hand, the microphone 1862 converts a collected sound signal into an electric signal. The audio circuit 1860 receives the electric signal and converts the electric signal into audio data, and outputs the audio data to the processor 1880 for processing. Then, the processor 1880 sends the audio data to, for example, another electronic device by using the RF circuit 1810, or outputs the audio data to the memory 1820 for further processing. The audio circuit 1860 may further include an earphone jack, to provide communication between a peripheral earphone and the electronic device 1800.

WiFi is a short distance wireless transmission technology. The electronic device 1800 may help, by using the Wi-Fi interface 1870, a user to receive and send an email, browse a webpage, access stream media, and the like, which provides wireless broadband Internet access for the user. Although FIG. 18 shows the Wi-Fi interface 1870, it may be understood that, the Wi-Fi interface 1870 does not belong to a constitution of the electronic device 1800, and can be ignored according to demands without changing the scope of the essence of the example embodiments.

The processor 1880 is the control center of the electronic device 1800, and is connected to various parts of the entire mobile phone by using various interfaces and lines. By running or executing the software program and/or module stored in the memory 1820, and invoking data stored in the memory 1820, the processor 1880 performs various functions and data processing of the electronic device 1800, thereby performing overall monitoring on the mobile phone. Optionally, the processor 1880 may include one or more processing units. The processor 1880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1880.

The electronic device 1800 further includes the power supply 1890 (such as a battery) for supplying power to the components. The power supply may be logically connected to the processor 1880 by using a power supply management system, thereby implementing functions, such as charging, discharging, and power consumption management, by using the power supply management system. The power supply 1890 may further include one or more of a direct current or alternating current power supply, a re-charging system, a power failure detection circuit, a power supply converter or inverter, a power supply state indicator, and any other component.

The electronic device 1800 may further include a Bluetooth module, and the like, which are not further described herein.

In example embodiments, the electronic device 1800 further includes a memory and one or more programs. The one or more programs are stored in the memory and executed by one or more processors. The one or more programs include an instruction used to perform the foregoing method on the side of the intelligent hardware or the side of the third-party application client.

In example embodiments, a non-transitory computer readable storage medium including an instruction is further provided, for example, a memory including an instruction, and the foregoing instruction may be executed by a processor of an electronic device to complete the foregoing identity authentication method. For example, the non-transitory computer readable storage medium may be a read only memory (ROM), a random-access memory (RAM), a CD-ROM, a magnetic tape, a floppy disk and an optical data storage device.

Figure 19:
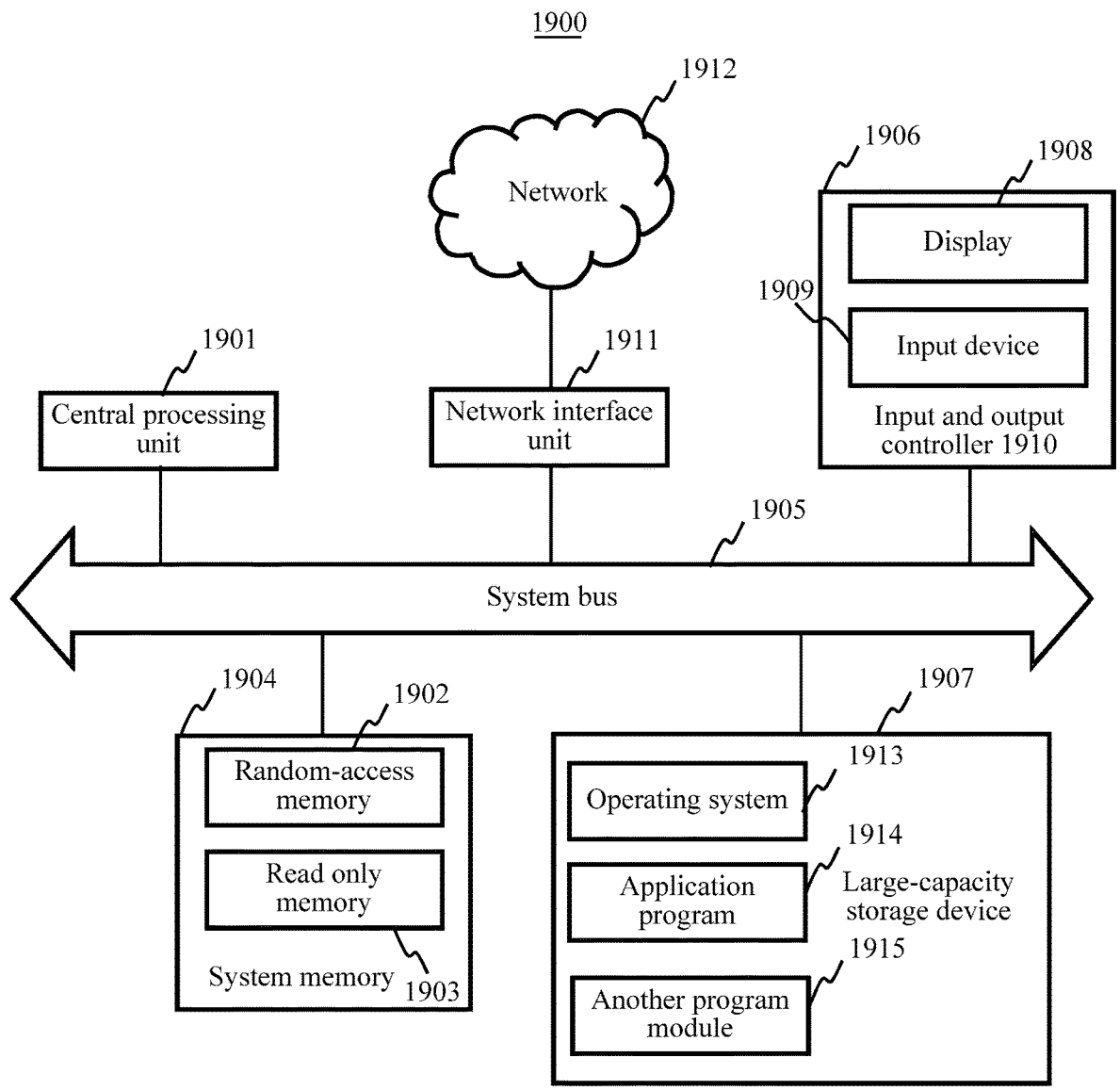
FIG. 19 is a schematic structural diagram of a server according to example embodiments.

FIG. 19 is a schematic structural diagram of a server according to example embodiments. The server may be the third-party application server or the authentication server in the foregoing example embodiments.

A server 1900 includes a central processing unit (CPU) 1901, a system memory 1904 including a RAM 1902 and a ROM 1903, and a system bus 1905 connecting the system memory 1904 and the CPU 1901. The server 1900 further includes a basic input/output system (I/O system) 1906 assisting in transmitting information between devices in a computer, and a large-capacity storage device 1907 configured to store an operating system 1913, an application program 1914 and another program module 1915.

The basic I/O system 1906 includes a display 1908 configured to display information and an input device 1909, such as a mouse or a keyboard configured to input information for a user. The display 1908 and the input device 1909 are both connected to the CPU 1901 by using an input and output controller 1910 connected to the system bus 1905. The basic I/O system 1906 may further include the input and output controller 1910 to be configured to receive and process inputs from multiple other devices such as a keyboard, a mouse, and an electronic stylus. Similarly, the input and output controller 1910 further provides an output to a display screen, a printer or another type of output device.

The large-capacity storage device 1907 is connected to the CPU 1901 by using a large-capacity storage controller connected to the system bus 1905. The large-capacity storage device 1907 and its associated computer readable medium provide non-volatile storage for the server 1900. That is to say, the large-capacity storage device 1907 may include the computer readable medium such as a hard disk or a CD-ROM driver.

The computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Persons skilled in art can know that the computer storage medium is not limited to the foregoing several types. The system memory 1904 and the large-capacity storage device 1907 may be collectively referred to as a memory.

According to example embodiments, the server 1900 may further be connected, by using a network such as the Internet, to a remote computer on the network and run. That is, the server 1900 may be connected to a network 1912 by using a network interface 1911 connected to the system bus 1905, or may also be connected to another type of network or remote computer system by using the network interface 1911.

The memory further includes one or more programs. The one or more programs are stored in the memory, and are executed by one or more processors, and the one or more programs include instructions used for performing the methods on the side of the foregoing third-party application server or the side of the authentication server.

In example embodiments, a non-transitory computer readable storage medium including an instruction is further provided, for example, a memory including an instruction, and the foregoing instruction may be executed by a processor of a server to complete the foregoing identity authentication method. For example, the non-transitory computer readable storage medium may be a ROM, a RAM, a CD-ROM, a magnetic tape, a floppy disk, or an optical data storage device.

The "plurality" in this specification means two or more. The term "and/or" in this specification describes an association between associated objects, indicating that three relationships may exist, for example, A and/or B may indicate three situations: only A exists, A and B exist at the same time, and only B exists. In addition, the character "/" in this specification usually represents that the former and latter associated objects are in an "or" relationship.

The sequence numbers of the preceding example embodiments are for description purpose but do not indicate the preference of the example embodiments.

A person of ordinary skill in the art may understand that all or some of the steps of the foregoing example embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are example embodiments, but are not intended to limit the present disclosure. Any modification, equivalent replacement, or improvement made within the spirit and principle of the present disclosure shall fall within the protection scope of the present disclosure.

What is claimed is:

1. An identity authentication method comprising:
    sending, by a third-party application client, an operation request to a third-party application server, in response to receiving a first operation indication for requesting to perform a target operation, the operation request requesting the third-party application server to perform the target operation;
    receiving, by the third-party application client, to-be-signed information from an authentication server via the third-party application server, in response to the operation request being sent, the to-be-signed information comprising a challenge random number;
    forwarding, by the third-party application client, the to-be-signed information that is received, to intelligent hardware;
    receiving, by the third-party application client, a first signature result from the intelligent hardware, the first signature result being obtained by signing the to-be-signed information that is forwarded, using an application private key corresponding to a third-party application;
    transparently transmitting, by the third-party application client, the first signature result that is received, to the authentication server via the third-party application server, to verify whether the first signature result is correct by using an application public key corresponding to the third-party application, and to trigger the third-party application server to perform the target operation when the first signature result is correct; and
    before the sending the operation request to the third-party application server:
        obtaining, by the third-party application client, an identifier of the intelligent hardware, in response to obtaining a second operation indication for requesting binding of the intelligent hardware;
        sending, by the third-party application client, a binding request to the application server via the third-party application server, the binding request comprising binding request information and the identifier of the intelligent hardware, and the binding request information requesting establishment of a binding relationship between the intelligent hardware and a user account that is used to log in to the third-party application client;

receiving, by the third-party application client, a registration request from the authentication server via the third-party application server, wherein the authentication server generates the registration request, in response to receiving the binding request from the third-party application server, and sends the registration request to the third-party application server;

transparently transmitting, by the third-party application client, the registration request to the intelligent hardware, wherein the intelligent hardware generates the application public key and the application private key, in response to receiving the registration request from the third-party application client, and signs the application public key by using a hardware private key corresponding to the intelligent hardware, to obtain a second signature result;

receiving, by the third-party application client, to-be-verified information from the intelligent hardware, the to-be-verified information comprising the application public key, the second signature result, and a hardware certificate of the intelligent hardware, and the hardware certificate of the intelligent hardware comprising a hardware public key corresponding to the intelligent hardware and the identifier of the intelligent hardware; and transparently transmitting, by the third-party application client, the to-be-verified information to the authentication server via the third-party application server.

2. The method according to claim 1,
wherein the authentication server:
retrieves the hardware public key from the hardware certificate of the intelligent hardware, in response to verifying that the hardware certificate of the intelligent hardware is authorized by using a root certificate public key;

stores a first binding relationship, in response to verifying that the second signature result is correct by using the hardware public key, the first binding relationship comprising a binding relationship among the identifier of the intelligent hardware, the user account, and the application public key; and sends the identifier of the intelligent hardware to the third-party application server, and wherein the third-party application server stores a second binding relationship, the second binding relationship comprising a binding relationship between the identifier of the intelligent hardware and the user account.

3. The method according to claim 2, further comprising, after the transparently transmitting the to-be-verified information to the authentication server:

transparently transmitting, by the third-party application client, a deregistration operation request to the authentication server via the third-party application server, in response to obtaining a third operation indication for requesting to perform a deregistration operation, the deregistration operation request comprising deregistration request information and the identifier of the intelligent hardware, the deregistration request information requesting execution of the deregistration operation, the deregistration operation being an unbinding operation or a loss-reporting operation, the unbinding operation being a release of the binding relationship between the intelligent hardware and the user account, and the loss-reporting operation being a report of a loss of the intelligent hardware, wherein the authentication server performs the deregistration operation, in response to receiving the deregistration operation request from the third-party application client.

4. The method according to claim 1, further comprising:
receiving, by the intelligent hardware, the to-be-signed information from the third-party application client;
signing, by the intelligent hardware, the to-be-signed information, using the application private key to obtain the first signature result; and
transparently transmitting, by the intelligent hardware, the first signature result to the authentication server via the third-party application client and the third-party application server.

5. The method according to claim 4, wherein the signing the to-be-signed information comprises:
obtaining, by the intelligent hardware, a value of a counter, the counter counting a quantity of times that the application private key is referenced; and
signing, by the intelligent hardware, the to-be-signed information and the value of the counter, using the application private key, to obtain the first signature result, and
the transmitting the first signature result to the authentication server comprises transparently transmitting, by the intelligent hardware, the first signature result and the value of the counter to the authentication server via the third-party application client and the third-party application server.

6. The method according to claim 5, further comprising, before the to-be-signed information is signed:
generating, by the intelligent hardware, confirmation prompt information, the confirmation prompt information being used to query whether to confirm execution of the target operation; and
signing, by the intelligent hardware, the to-be-signed information, using the application private key, to obtain the first signature result, in response to obtaining a confirmation indication corresponding to the confirmation prompt information.

7. The method according to claim 4, further comprising, before the to-be-signed information is received:
receiving, by the intelligent hardware, a registration request from the third-party application client,
wherein the authentication server generates the registration request, in response to receiving a binding request from the third-party application server, and transparently transmits the registration request to the third-party application client via the third-party application server, and
wherein the third-party application client sends the binding request to the third-party application server, in response to obtaining a second operation indication for requesting binding of the intelligent hardware, the binding request comprising binding request information and an identifier of the intelligent hardware, and the binding request information requesting establishment of a binding relationship between the intelligent hardware and a user account that is used to log in to the third-party application client;
generating, by the intelligent hardware, the application public key and the application private key, in response to the registration request being received;

signing, by the intelligent hardware, the application public key, using a hardware private key corresponding to the intelligent hardware, to obtain a second signature result; and transparently transmitting, by the intelligent hardware, to-be-verified information to the authentication server via the third-party application client and the third-party application server sequentially, the to-be-verified information comprising the application public key, the second signature result, and a hardware certificate of the intelligent hardware, and the hardware certificate of the intelligent hardware comprising a hardware public key corresponding to the intelligent hardware and the identifier of the intelligent hardware, wherein the authentication server:

retrieves the hardware public key corresponding to the intelligent hardware from the hardware certificate of the intelligent hardware, in response to verifying that the hardware certificate of the intelligent hardware is authorized by using a root certificate public key;

stores a first binding relationship, in response to verifying that the second signature result is correct by using the hardware public key, the first binding relationship comprising a binding relationship among the identifier of the intelligent hardware, the user account, and the application public key; and sends the identifier of the intelligent hardware to the third-party application server, and wherein the third-party application server stores a second binding relationship, the second binding relationship comprising a binding relationship between the identifier of the intelligent hardware and the user account.

8. The method according to claim 7, further comprising, in response to the registration request being received:

generating, by the intelligent hardware, an application key index, the application key index being used to index the application public key and the application private key; and sending, by the intelligent hardware, the application key index to the authentication server via the third-party application client and the third-party application server, the first binding relationship comprising a binding relationship among the identifier of the intelligent hardware, the user account, the application key index, and the application public key, and the second binding relationship comprising a binding relationship among the identifier of the intelligent hardware, the user account, and the application key index.

9. The method according to claim 8, wherein the registration request comprises an application parameter, and the method further comprises:

generating, by the intelligent hardware, a digest value of the application parameter and the application private key;

generating, by the intelligent hardware, a random number; and generating, by the intelligent hardware, the application key index, based on the digest value and the random number.

10. An identity authentication method comprising:

receiving, by a third-party application server, an operation request from a third-party application client, the operation request requesting the third-party application server to perform a target operation;

requesting and receiving, by the third-party application server, to-be-signed information from an authentication server, in response to the operation request being received, the to-be-signed information comprising a challenge random number;

forwarding, by the third-party application server, the to-be-signed information that is received, to intelligent hardware via the third-party application client;

receiving, by the third-party application server, a first signature result from the intelligent hardware via the third-party application client, the first signature result being obtained by signing the to-be-signed information that is forwarded, using an application private key corresponding to a third-party application;

transparently transmitting, by the third-party application server, the first signature result that is received, to the authentication server;

receiving, by the third-party application server, a verification success indication from the authentication server, in response to the first signature result that is transmitted being verified to be correct by using an application public key corresponding to the third-party application;

performing, by the third-party application server, the target operation, in response to the verification success indication being received; and before the receiving the operation request from the third-party application client, further comprising:

receiving, by the third-party application server, a binding request from the third-party application client, wherein the third-party application client sends the binding request, in response to obtaining a first operation indication for requesting binding of the intelligent hardware, the binding request comprising binding request information and an identifier of the intelligent hardware, and the binding request information requesting establishment of a binding relationship between the intelligent hardware and a user account that is used to log in to the third-party application client;

forwarding, by the third-party application server, the binding request to the authentication server, the binding request comprising the binding request information and the identifier of the intelligent hardware;

receiving, by the third-party application server, a registration request from the authentication server, wherein the authentication server generates and sends the registration request to the third-party application server, in response to receiving the binding request from the third-party application server;

transparently transmitting, by the third-party application server, the registration request to the intelligent hardware via the third-party application client, wherein the intelligent hardware generates the application public key and the application private key, in response to receiving the registration request from the third-party application server, and signs the application public key by using a hardware private key corresponding to the intelligent hardware, to obtain a second signature result;

receiving, by the third-party application server, to-be-verified information from the third-party application client, wherein the intelligent hardware sends the to-be-verified information to the third-party application client, the to-be-verified information comprising the application public key, the second signature result, and a hardware certificate of the intelligent hardware, and the hardware certificate of the intelligent hardware comprising a hardware public key corresponding to the intelligent hardware and the identifier of the intelligent hardware; and transparently transmitting, by the third-party application server, the to-be-verified information to the authentication server.

11. The method according to claim 10, wherein the requesting and receiving the to-be-signed information from the authentication server comprises:

obtaining, by the third-party application server, an identifier of the intelligent hardware;

sending, by the third-party application server, an authentication request to the authentication server, the authentication request comprising authentication request information and the identifier of the intelligent hardware, and the authentication request information requesting the authentication server to generate the to-be-signed information; and receiving, by the third-party application server, the to-be-signed information from the authentication server, wherein the authentication server generates the to-be-signed information, in response to obtaining an availability status of the intelligent hardware, based on the identifier of the intelligent hardware, and the availability status of the intelligent hardware indicating that the intelligent hardware is available.

12. The method according to claim 10, wherein the authentication server:

retrieves the hardware public key from the hardware certificate of the intelligent hardware, in response to verifying that the hardware certificate of the intelligent hardware is authorized by using a root certificate public key;

stores a first binding relationship, in response to verifying that the second signature result is correct by using the hardware public key, the first binding relationship comprising a binding relationship among the identifier of the intelligent hardware, the user account, and the application public key; and sends the identifier of the intelligent hardware to the third-party application server, and wherein the method further comprises:

receiving, by the third-party application server, the identifier of the intelligent hardware from the authentication server; and storing, by the third-party application server, a second binding relationship, the second binding relationship comprising a binding relationship between the identifier of the intelligent hardware and the user account.

13. The method according to claim 12, further comprising, after the storing the second binding relationship:

receiving, by the third-party application server, a deregistration operation request from the third-party application client, wherein the third-party application client sends the deregistration operation request to the third-party application server, in response to obtaining a second operation indication for requesting to perform a deregistration operation, the deregistration operation comprising deregistration request information and the identifier of the intelligent hardware, the deregistration request information requesting execution of the deregistration operation, the deregistration operation being an unbinding operation or a loss-reporting operation, the unbinding operation being a release of the binding relationship between the intelligent hardware and the user account, and the loss-reporting operation being a report of a loss of the intelligent hardware; and transparently transmitting, by the third-party application server, the deregistration operation request to the authentication server, wherein the authentication server performs the deregistration operation, in response to receiving the deregistration operation request from the third-party application server.

14. A third-party application client comprising:

at least one first memory configured to store first computer program code; and at least one first processor configured to access the at least one first memory and operate according to the first computer program code, the first computer program code including:

first sending code configured to cause the at least one first processor to send an operation request to a third-party application server, in response to receiving a first operation indication for requesting to perform a target operation, the operation request requesting the third-party application server to perform the target operation;

first receiving code configured to cause the at least one first processor to receive to-be-signed information from an authentication server via the third-party application server, in response to the operation request being sent, the to-be-signed information comprising a challenge random number;

forwarding code configured to cause the at least one first processor to forward the to-be-signed information that is received, to intelligent hardware;

second receiving code configured to cause the at least one first processor to receive a first signature result from the intelligent hardware, the first signature result being obtained by signing the to-be-signed information that is forwarded, using an application private key corresponding to a third-party application;

first transmitting code configured to cause the at least one first processor to transparently transmit the first signature result that is received, to the authentication server via the third-party application server, to verify whether the first signature result is correct by using an application public key corresponding to the third-party application, and to trigger the third-party application server to perform the target operation when the first signature result is correct;

obtaining code configured to cause the at least one first processor to obtain an identifier of the intelligent hardware, in response to obtaining a second operation indication for requesting binding of the intelligent hardware;

second sending code configured to cause the at least one first processor to send a binding request to the application server via the third-party application server, the binding request comprising binding request information and the identifier of the intelligent hardware, and the binding request information requesting establishment of a binding relationship between the intelligent hardware and a user account that is used to log in to the third-party application client;

third receiving code configured to cause the at least one first processor to receive a registration request from the authentication server via the third-party application server, wherein the authentication server generates the registration request, in response to receiving the binding request from the third-party application server, and sends the registration request to the third-party application server;

second transmitting code configured to cause the at least one first processor to transparently transmit the registration request to the intelligent hardware, wherein the intelligent hardware generates the application public key and the application private key, in response to receiving the registration request from the third-party application client, and signs the application public key by using a hardware private key corresponding to the intelligent hardware, to obtain a second signature result;

fourth receiving code configured to cause the at least one first processor to receive to-be-verified information from the intelligent hardware, the to-be-verified information comprising the application public key, the second signature result, and a hardware certificate of the intelligent hardware, and the hardware certificate of the intelligent hardware comprising a hardware public key corresponding to the intelligent hardware and the identifier of the intelligent hardware; and third transmitting code configured to cause the at least one first processor to transparently transmit the to-be-verified information to the authentication server via the third-party application server.

15. The third-party application client according to claim 14,
wherein the authentication server:
retrieves the hardware public key from the hardware certificate of the intelligent hardware, in response to verifying that the hardware certificate of the intelligent hardware is authorized by using a root certificate public key;
stores a first binding relationship, in response to verifying that the second signature result is correct by using the hardware public key, the first binding relationship comprising a binding relationship among the identifier of the intelligent hardware, the user account, and the application public key; and
sends the identifier of the intelligent hardware to the third-party application server, and
wherein the third-party application server stores a second binding relationship, the second binding relationship comprising a binding relationship between the identifier of the intelligent hardware and the user account.

16. The third-party application client according to claim 15, wherein the first computer program code further includes:
fourth transmitting code configured to cause the at least one first processor to transparently transmit a deregistration operation request to the authentication server via the third-party application server, in response to obtaining a third operation indication for requesting to perform a deregistration operation, the deregistration operation request comprising deregistration request information and the identifier of the intelligent hardware, the deregistration request information requesting execution of the deregistration operation, the deregistration operation being an unbinding operation or a loss-reporting operation, the unbinding operation being a release of the binding relationship between the intelligent hardware and the user account, and the loss-reporting operation being a report of a loss of the intelligent hardware,
wherein the authentication server performs the deregistration operation, in response to receiving the deregistration operation request from the third-party application client.

17. Intelligent hardware connected to the third-party application client according to claim 14, the intelligent hardware comprising:
at least one second memory configured to store second computer program code; and
at least one second processor configured to access the at least one second memory and operate according to the second computer program code, the second computer program code including:
third receiving code configured to cause the at least one second processor to receive the to-be-signed information from the third-party application client;
first signing code configured to cause the at least one second processor to sign the to-be-signed information, using the application private key to obtain the first signature result; and
second transmitting code configured to cause the at least one second processor to transparently transmit the first signature result to the authentication server via the third-party application client and the third-party application server.

18. The intelligent hardware according to claim 17, wherein the second computer program code further includes:
obtaining configured to cause the at least one second processor to obtain a value of a counter, the counter counting a quantity of times that the application private key is referenced;
second signing code configured to cause the at least one second processor to sign the to-be-signed information and the value of the counter, using the application private key, to obtain the first signature result, and
third transmitting code configured to cause the at least one second processor to transparently transmit the first signature result and the value of the counter to the authentication server via the third-party application client and the third-party application server.

19. The intelligent hardware according to claim 18, wherein the second computer program code further includes:
generating code configured to cause the at least one second processor to generate confirmation prompt information, the confirmation prompt information being used to query whether to confirm execution of the target operation; and
third signing code configured to cause the at least one second processor to sign the to-be-signed information, using the application private key, to obtain the first signature result, in response to obtaining a confirmation indication corresponding to the confirmation prompt information.

20. The intelligent hardware according to claim 17, wherein the second computer program code further includes:
fourth receiving code configured to cause the at least one second processor to receive a registration request from the third-party application client,
wherein the authentication server generates the registration request, in response to receiving a binding request from the third-party application server, and transparently transmits the registration request to the third-party application client via the third-party application server, and
wherein the third-party application client sends the binding request to the third-party application server, in response to obtaining a second operation indication for requesting binding of the intelligent hardware, the binding request comprising binding request information and an identifier of the intelligent hardware, and the binding request information requesting establishment of a binding relationship between the intelligent hardware and a user account that is used to log in to the third-party application client;

generating code configured to cause the at least one second processor to generate the application public key and the application private key, in response to the registration request being received;

second signing code configured to cause the at least one second processor to sign the application public key, using a hardware private key corresponding to the intelligent hardware, to obtain a second signature result; and third transmitting code configured to cause the at least one second processor to transparently transmit to-be-verified information to the authentication server via the third-party application client and the third-party application server sequentially, the to-be-verified information comprising the application public key, the second signature result, and a hardware certificate of the intelligent hardware, and the hardware certificate of the intelligent hardware comprising a hardware public key corresponding to the intelligent hardware and the identifier of the intelligent hardware, wherein the authentication server:
retrieves the hardware public key corresponding to the intelligent hardware from the hardware certificate of the intelligent hardware, in response to verifying that the hardware certificate of the intelligent hardware is authorized by using a root certificate public key;

stores a first binding relationship, in response to verifying that the second signature result is correct by using the hardware public key, the first binding relationship comprising a binding relationship among the identifier of the intelligent hardware, the user account, and the application public key; and sends the identifier of the intelligent hardware to the third-party application server, and wherein the third-party application server stores a second binding relationship, the second binding relationship comprising a binding relationship between the identifier of the intelligent hardware and the user account.

* * * * *